United States Patent
Das Sharma

(10) Patent No.: US 12,216,607 B2
(45) Date of Patent: Feb. 4, 2025

(54) SOURCE ORDERING IN DEVICE INTERCONNECTS

(71) Applicant: Intel Corporation, Santa Clara, CA (US)

(72) Inventor: Debendra Das Sharma, Saratoga, CA (US)

(73) Assignee: Intel Corporation, Santa Clara, CA (US)

( * ) Notice: Subject to any disclaimer, the term of this patent is extended or adjusted under 35 U.S.C. 154(b) by 668 days.

(21) Appl. No.: 17/238,156

(22) Filed: Apr. 22, 2021

(65) Prior Publication Data

US 2021/0240655 A1 Aug. 5, 2021

Related U.S. Application Data

(60) Provisional application No. 63/114,440, filed on Nov. 16, 2020.

(51) Int. Cl.
*G06F 13/42* (2006.01)
*G06F 13/16* (2006.01)
*G06F 13/40* (2006.01)

(52) U.S. Cl.
CPC ...... *G06F 13/4221* (2013.01); *G06F 13/1626* (2013.01); *G06F 13/1668* (2013.01); *G06F 13/4022* (2013.01); *G06F 2213/0026* (2013.01)

(58) Field of Classification Search
CPC .............................. G06F 2213/0026
See application file for complete search history.

(56) References Cited

U.S. PATENT DOCUMENTS

| | | | |
|---|---|---|---|
| 10,452,593 B1* | 10/2019 | Jalal | G06F 13/382 |
| 10,664,184 B1* | 5/2020 | Mitra | G06F 3/0688 |
| 2006/0106982 A1 | 5/2006 | Ashmore et al. | |
| 2006/0161709 A1* | 7/2006 | Davies | G06F 13/404 |
| | | | 710/268 |
| 2006/0277347 A1* | 12/2006 | Ashmore | G06F 12/0866 |
| | | | 711/E12.019 |

(Continued)

OTHER PUBLICATIONS

Ajanovic, Jasminl, "PCI Express 3.0 Overview," Intel Corporation, 2009 IEEE HotChips 21 Symposium (HCS) Aug. 23, 2009 (61 pages).

(Continued)

*Primary Examiner* — Henry Tsai
*Assistant Examiner* — Aurangzeb Hassan
(74) *Attorney, Agent, or Firm* — Alliance IP, LLC

(57) ABSTRACT

In one embodiment, an apparatus includes a port to transmit and receive data over a link; and protocol stack circuitry to implement one or more layers of a load-store input/output (I/O)-based protocol (e.g., PCIe or CXL) across the link. The protocol stack circuitry constructs memory write request transaction layer packets (TLPs) for memory write transactions, wherein fields of the memory write request TLPs indicate a virtual channel (VC) other than VC0, that a completion is required in response to the memory write transaction, and a stream identifier associated with the memory write transaction. The memory write request TLP is transmitted over the link and a completion TLP is received over the link in response, indicating a completion for the memory write request TLP.

23 Claims, 16 Drawing Sheets

(56) References Cited

U.S. PATENT DOCUMENTS

| | | | |
|---|---|---|---|
| 2012/0284446 A1* | 11/2012 | Biran | G06F 13/36 |
| | | | 710/306 |
| 2014/0269471 A1* | 9/2014 | Wagh | G06F 1/3278 |
| | | | 370/311 |
| 2015/0007189 A1* | 1/2015 | De Gruijl | H04L 47/39 |
| | | | 718/104 |
| 2015/0269116 A1* | 9/2015 | Raikin | B01J 35/04 |
| | | | 709/212 |
| 2016/0179427 A1* | 6/2016 | Jen | G06F 3/0625 |
| | | | 711/147 |
| 2018/0095925 A1* | 4/2018 | Iyer | G06F 13/4265 |
| 2018/0191374 A1 | 7/2018 | Wu et al. | |
| 2019/0238179 A1* | 8/2019 | Iyer | G06F 13/20 |
| 2019/0281025 A1 | 9/2019 | Harriman et al. | |
| 2019/0347125 A1 | 11/2019 | Sankaran et al. | |
| 2020/0004703 A1 | 1/2020 | Sankaran et al. | |
| 2020/0151362 A1 | 5/2020 | Harriman et al. | |
| 2020/0226091 A1* | 7/2020 | Harriman | G06F 13/4282 |
| 2020/0257629 A1 | 8/2020 | Pinto | |
| 2021/0240655 A1 | 8/2021 | Sharma | |
| 2022/0060382 A1* | 2/2022 | McGraw | H04L 49/70 |
| 2022/0078043 A1* | 3/2022 | Marcovitch | G06F 15/17331 |

OTHER PUBLICATIONS

Netherlands Patent Office Search Report in NL Patent Application Serial No. 2029511 dated Feb. 16, 2023 (11 pages).
PCT International Search Report and Written Opinion in PCT International Application Serial No. PCT/US2021/050987 mailed on Jan. 5, 2022 (8 pages).

* cited by examiner

| Format [2b] | Type [5b] | R | TC [3b] | R [4b] | T D | E P | Attr [2b] | R [2b] | Length [10b] |
|---|---|---|---|---|---|---|---|---|---|
| Completer ID [16b] | | | | | Status [3b] | | B C M | | Byte Count [12b] |
| Requester ID [16b] | | | | | Tag [8b] | | | R | Lower Address [7b] |
| Data [32b] | | | | | | | | | |

*FIG. 3D*

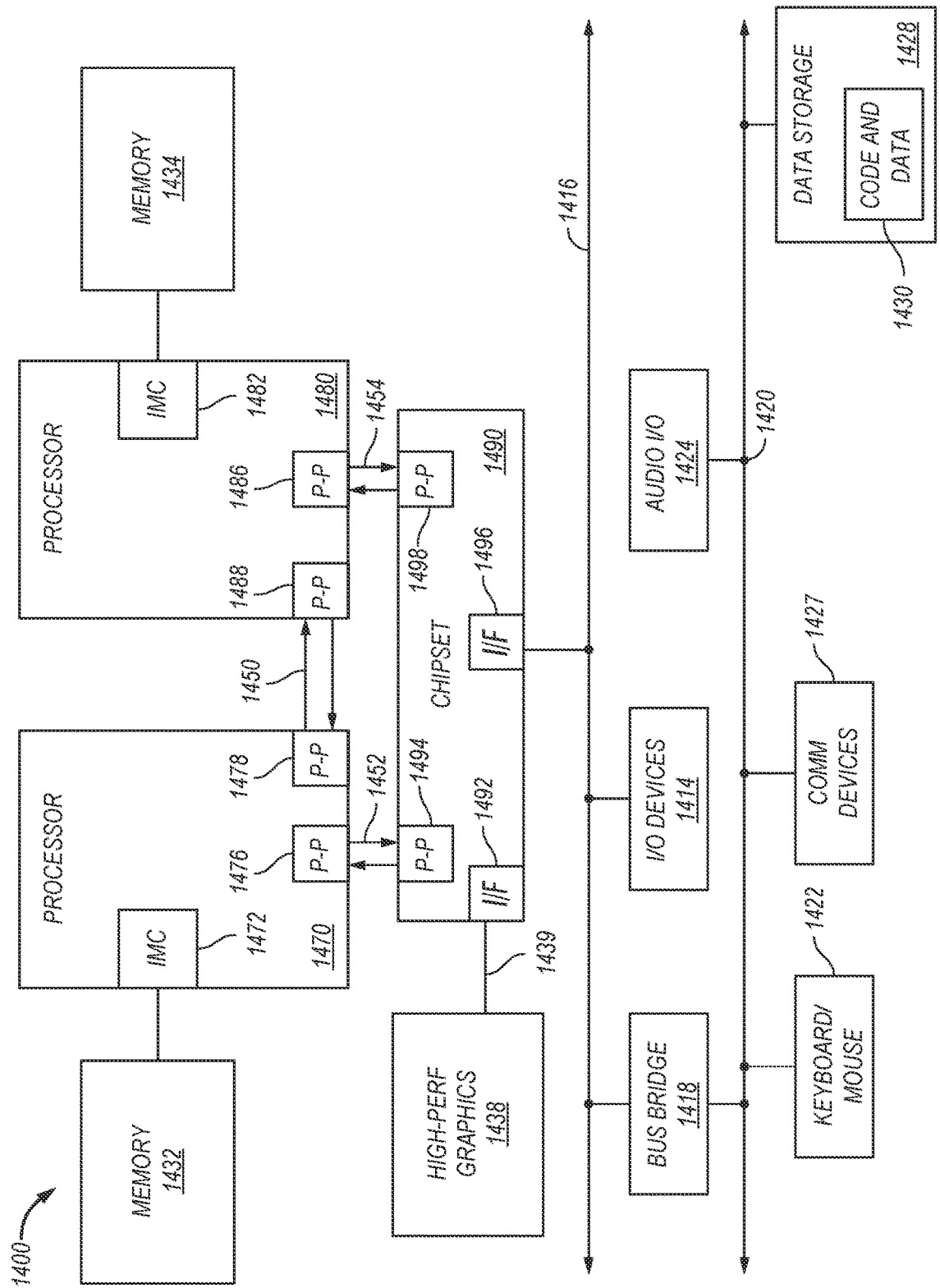

SOURCE ORDERING IN DEVICE INTERCONNECTS

CROSS-REFERENCE TO RELATED APPLICATIONS

This application claims the benefit of and priority from U.S. Provisional Patent Application No. 63/114,440 entitled "Source Ordering in PCIe or CXL.IO" and filed Nov. 16, 2020, the entire disclosure of which is incorporated herein by reference.

FIELD

This disclosure pertains to computing systems, and in particular (but not exclusively) to source ordering in device interconnects such as Peripheral Component Interconnect Express (PCIe)- and/or Compute Express Link (CXL)-based interconnects.

BACKGROUND

Advances in semi-conductor processing and logic design have permitted an increase in the amount of logic that may be present on integrated circuit devices. As a corollary, computer system configurations have evolved from a single or multiple integrated circuits in a system to multiple cores, multiple hardware threads, and multiple logical processors present on individual integrated circuits, as well as other interfaces integrated within such processors. A processor or integrated circuit typically comprises a single physical processor die, where the processor die may include any number of cores, hardware threads, logical processors, interfaces, memory, controller hubs, etc. As the processing power grows along with the number of devices in a computing system, the communication between sockets and other devices becomes more critical. Accordingly, interconnects, have grown from more traditional multi-drop buses that primarily handled electrical communications to full blown interconnect architectures that facilitate fast communication. Unfortunately, as the demand for future processors to consume at even higher-rates corresponding demand is placed on the capabilities of existing interconnect architectures. Interconnect architectures may be based on a variety of technologies, including Peripheral Component Interconnect Express (PCIe), Compute Express Link (CXL), Universal Serial Bus, and others.

BRIEF DESCRIPTION OF THE DRAWINGS

FIGS. 3A-3D illustrate example transaction layer packet (TLP) formats for use within an interconnect architecture.

FIG. 14 illustrates an embodiment of a block for a computing system including multiple processors.

DETAILED DESCRIPTION

Figure 1:
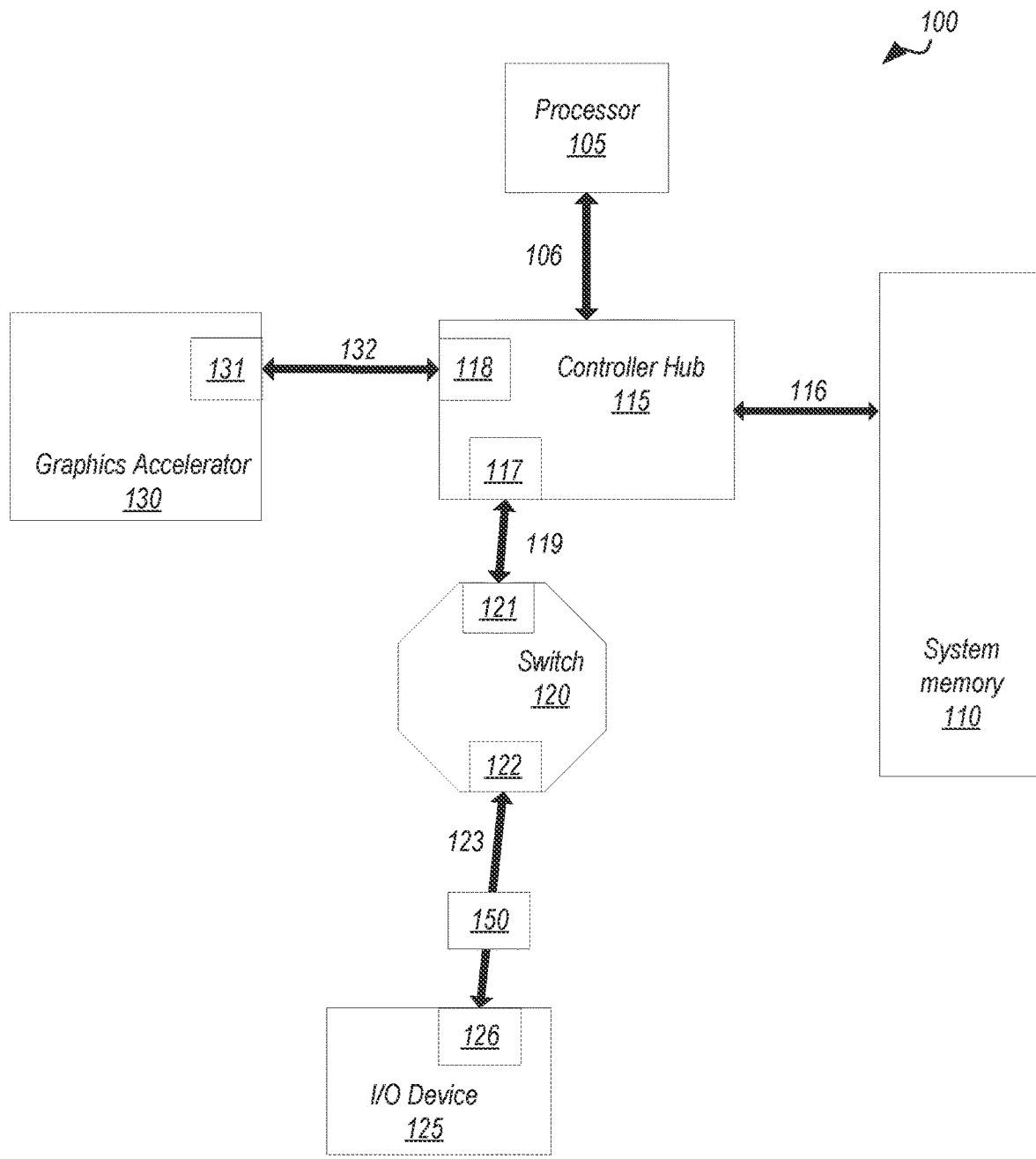
FIG. 1 illustrates an embodiment of a computing system including an interconnect architecture.

In the following description, numerous specific details are set forth, such as examples of specific types of processors and system configurations, specific hardware structures, specific architectural and micro architectural details, specific register configurations, specific instruction types, specific system components, specific measurements/heights, specific processor pipeline stages and operation etc. in order to provide a thorough understanding of the present disclosure. It will be apparent, however, to one skilled in the art that these specific details need not be employed to practice embodiments of the present disclosure. In other instances, well known components or methods, such as specific and alternative processor architectures, specific logic circuits/code for described algorithms, specific firmware code, specific interconnect operation, specific logic configurations, specific manufacturing techniques and materials, specific compiler implementations, specific expression of algorithms in code, specific power down and gating techniques/logic and other specific operational details of computer system haven't been described in detail in order to avoid unnecessarily obscuring embodiments of the present disclosure.

Although the following embodiments may be described with reference to energy conservation and energy efficiency in specific integrated circuits, such as in computing platforms or microprocessors, other embodiments are applicable to other types of integrated circuits and logic devices. Similar techniques and teachings of embodiments described herein may be applied to other types of circuits or semiconductor devices that may also benefit from better energy efficiency and energy conservation. For example, the disclosed embodiments are not limited to desktop computer systems or Ultrabooks™. And may be also used in other devices, such as handheld devices, tablets, other thin notebooks, systems on a chip (SOC) devices, and embedded applications. Some examples of handheld devices include cellular phones, Internet protocol devices, digital cameras, personal digital assistants (PDAs), and handheld PCs. Embedded applications typically include a microcontroller, a digital signal processor (DSP), a system on a chip, network computers (NetPC), set-top boxes, network hubs, wide area network (WAN) switches, or any other system that can perform the functions and operations taught below. Moreover, the apparatus', methods, and systems described herein are not limited to physical computing devices, but may also relate to software optimizations for energy conservation and efficiency. As will become readily apparent in the description below, the embodiments of methods, apparatus', and systems described herein (whether in reference to hardware, firmware, software, or a combination thereof) are vital to a 'green technology' future balanced with performance considerations.

As computing systems are advancing, the components therein are becoming more complex. As a result, the interconnect architecture to couple and communicate between the components is also increasing in complexity to ensure bandwidth requirements are met for optimal component operation. Furthermore, different market segments demand different aspects of interconnect architectures to suit the market's needs. For example, servers require higher performance, while the mobile ecosystem is sometimes able to sacrifice overall performance for power savings. Yet, it's a singular purpose of most fabrics to provide highest possible performance with maximum power saving. Below, a number of interconnects are discussed, which would potentially benefit from aspects of the present disclosure.

One interconnect fabric architecture includes the Peripheral Component Interconnect (PCI) Express (PCIe) architecture. A primary goal of PCIe is to enable components and devices from different vendors to inter-operate in an open architecture, spanning multiple market segments; Clients (Desktops and Mobile), Servers (Standard, Rack Scale, Cloud, Fog, Enterprise, etc.), and Embedded and Communication devices. PCI Express is a high performance, general purpose I/O interconnect defined for a wide variety of future computing and communication platforms. Some PCI attributes, such as its usage model, load-store architecture, and software interfaces, have been maintained through its revisions, whereas previous parallel bus implementations have been replaced by a highly scalable, fully serial interface. The more recent versions of PCI Express take advantage of advances in point-to-point interconnects, Switch-based technology, and packetized protocol to deliver new levels of performance and features. Power Management, Quality Of Service (QoS), Hot-Plug/Hot-Swap support, Data Integrity, and Error Handling are among some of the advanced features supported by PCI Express.

Referring to FIG. 1, an embodiment of a fabric composed of point-to-point Links that interconnect a set of components is illustrated. System 100 includes processor 105 and system memory 110 coupled to controller hub 115. Processor 105 includes any processing element, such as a microprocessor, a host processor, an embedded processor, a co-processor, or other processor. Processor 105 is coupled to controller hub 115 through front-side bus (FSB) 106. In one embodiment, FSB 106 is a serial point-to-point interconnect as described below. In another embodiment, link 106 includes a serial, differential interconnect architecture that is compliant with different interconnect standard. In some implementations, the system may include logic to implement multiple protocol stacks and further logic to negotiation alternate protocols to be run on top of a common physical layer, among other example features.

System memory 110 includes any memory device, such as random access memory (RAM), non-volatile (NV) memory, or other memory accessible by devices in system 100. System memory 110 is coupled to controller hub 115 through memory interface 116. Examples of a memory interface include a double-data rate (DDR) memory interface, a dual-channel DDR memory interface, and a dynamic RAM (DRAM) memory interface.

In one embodiment, controller hub 115 is a root hub, root complex, or root controller in a Peripheral Component Interconnect Express (PCIe or PCIE) interconnection hierarchy. Examples of controller hub 115 include a chipset, a memory controller hub (MCH), a northbridge, an interconnect controller hub (ICH) a southbridge, and a root controller/hub. Often the term chipset refers to two physically separate controller hubs, i.e. a memory controller hub (MCH) coupled to an interconnect controller hub (ICH). Note that current systems often include the MCH integrated with processor 105, while controller 115 is to communicate with I/O devices, in a similar manner as described below. In some embodiments, peer-to-peer routing is optionally supported through root complex 115.

Here, controller hub 115 is coupled to switch/bridge 120 through serial link 119. Input/output modules 117 and 121, which may also be referred to as interfaces/ports 117 and 121, include/implement a layered protocol stack to provide communication between controller hub 115 and switch 120. In one embodiment, multiple devices are capable of being coupled to switch 120.

Switch/bridge 120 routes packets/messages from device 125 upstream, i.e. up a hierarchy towards a root complex, to controller hub 115 and downstream, i.e. down a hierarchy away from a root controller, from processor 105 or system memory 110 to device 125. Switch 120, in one embodiment, is referred to as a logical assembly of multiple virtual PCI-to-PCI bridge devices. Device 125 includes any internal or external device or component to be coupled to an electronic system, such as an I/O device, a Network Interface Controller (NIC), an add-in card, an audio processor, a network processor, a hard-drive, a storage device, a CD/DVD ROM, a monitor, a printer, a mouse, a keyboard, a router, a portable storage device, a Firewire device, a Universal Serial Bus (USB) device, a scanner, and other input/output devices. Often in the PCIe vernacular, such as device, is referred to as an endpoint. Although not specifically shown, device 125 may include a PCIe to PCI/PCI-X bridge to support legacy or other version PCI devices. Endpoint devices in PCIe are often classified as legacy, PCIe, or root complex integrated endpoints.

Graphics accelerator 130 is also coupled to controller hub 115 through serial link 132. In one embodiment, graphics accelerator 130 is coupled to an MCH, which is coupled to an ICH. Switch 120, and accordingly I/O device 125, is then coupled to the ICH. I/O modules 131 and 118 are also to implement a layered protocol stack to communicate between graphics accelerator 130 and controller hub 115. Similar to the MCH discussion above, a graphics controller or the graphics accelerator 130 itself may be integrated in processor 105. Further, one or more links (e.g., 123) of the system can include one or more extension devices (e.g., 150), such as retimers, repeaters, etc.

Figure 2:
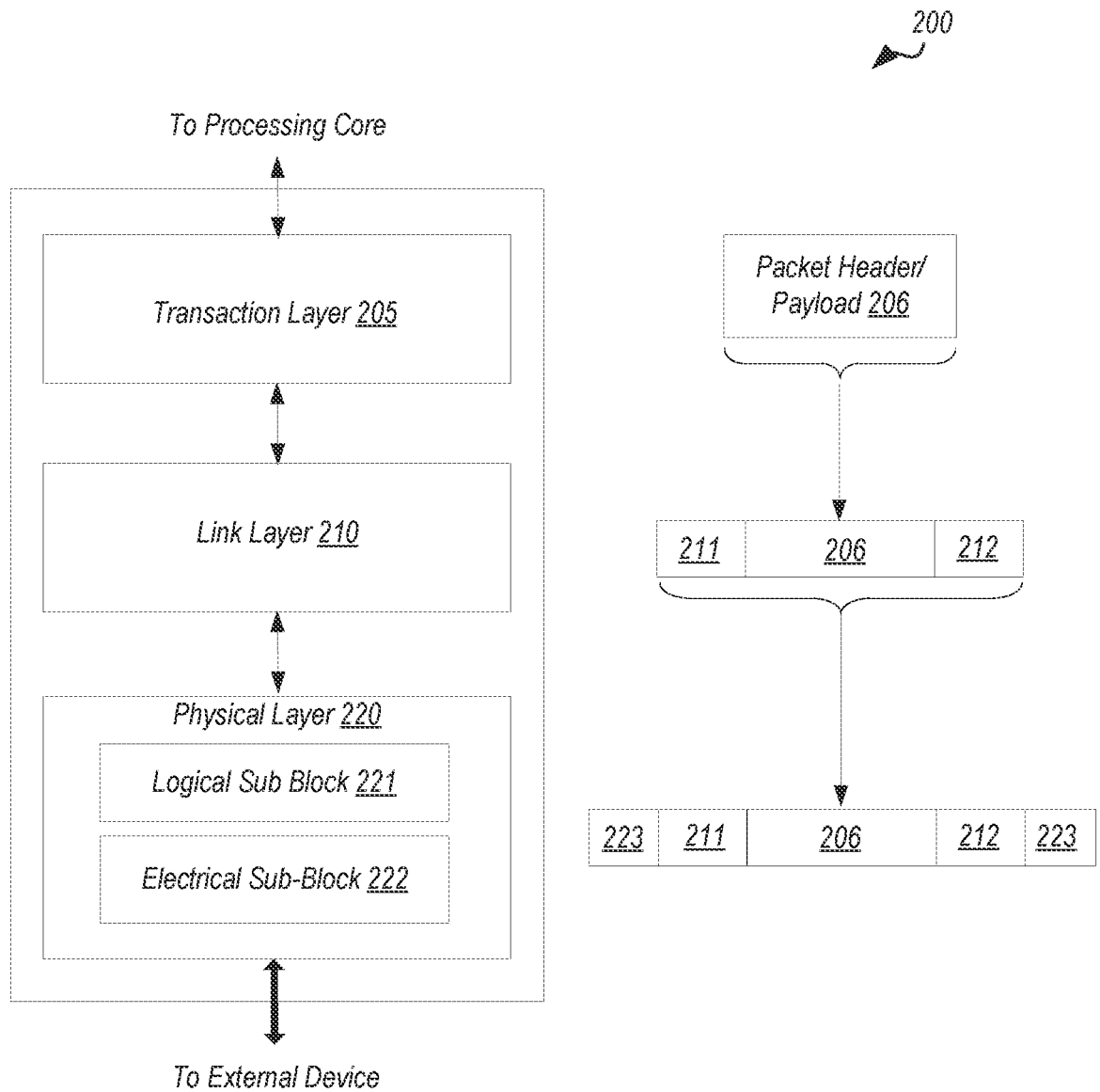
FIG. 2 illustrates an embodiment of a interconnect architecture including a layered stack.

Turning to FIG. 2 an embodiment of a layered protocol stack is illustrated. Layered protocol stack 200 includes any form of a layered communication stack, such as a Quick Path Interconnect (QPI) stack, a PCIe stack, a next generation high performance computing interconnect stack, or other layered stack. Although the discussion immediately below in reference to FIGS. 1-4 are in relation to a PCIe stack, the same concepts may be applied to other interconnect stacks. In one embodiment, protocol stack 200 is a PCIe protocol stack including transaction layer 205, link layer 210, and physical layer 220. An interface, such as interfaces 117, 118, 121, 122, 126, and 131 in FIG. 1, may be represented as communication protocol stack 200. Representation as a communication protocol stack may also be referred to as a module or interface implementing/including a protocol stack.

PCI Express uses packets to communicate information between components. Packets are formed in the Transaction Layer 205 and Data Link Layer 210 to carry the information from the transmitting component to the receiving component. As the transmitted packets flow through the other layers, they are extended with additional information necessary to handle packets at those layers. At the receiving side the reverse process occurs and packets get transformed from their Physical Layer 220 representation to the Data Link Layer 210 representation and finally (for Transaction Layer Packets) to the form that can be processed by the Transaction Layer 205 of the receiving device.

Transaction Layer

In one embodiment, transaction layer 205 is to provide an interface between a device's processing core and the interconnect architecture, such as data link layer 210 and physical layer 220. In this regard, a primary responsibility of the transaction layer 205 is the assembly and disassembly of packets (i.e., transaction layer packets, or TLPs). The translation layer 205 typically manages credit-base flow control for TLPs. PCIe implements split transactions, i.e. transactions with request and response separated by time, allowing a link to carry other traffic while the target device gathers data for the response.

In addition PCIe utilizes credit-based flow control. In this scheme, a device advertises an initial amount of credit for each of the receive buffers in Transaction Layer 205. An external device at the opposite end of the link, such as controller hub 115 in FIG. 1, counts the number of credits consumed by each TLP. A transaction may be transmitted if the transaction does not exceed a credit limit. Upon receiving a response an amount of credit is restored. An advantage of a credit scheme is that the latency of credit return does not affect performance, provided that the credit limit is not encountered.

In one embodiment, four transaction address spaces include a configuration address space, a memory address space, an input/output address space, and a message address space. Memory space transactions include one or more of read requests and write requests to transfer data to/from a memory-mapped location. In one embodiment, memory space transactions are capable of using two different address formats, e.g., a short address format, such as a 32-bit address, or a long address format, such as 64-bit address. Configuration space transactions are used to access configuration space of the PCIe devices. Transactions to the configuration space include read requests and write requests. Message space transactions (or, simply messages) are defined to support in-band communication between PCIe agents.

Therefore, in one embodiment, transaction layer 205 assembles packet header/payload 206. Format for current packet headers/payloads may be found in the PCIe specification at the PCIe specification website.

Figure 3A:
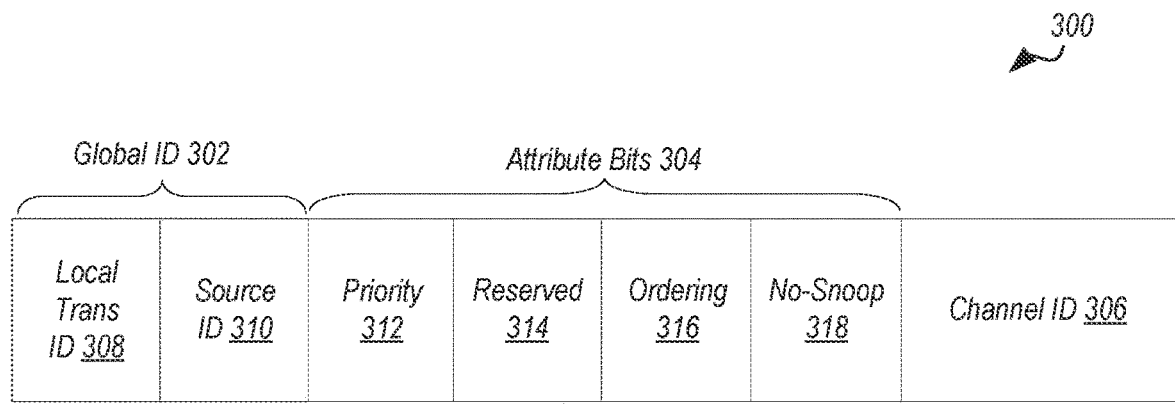

FIGS. 3A-3D illustrate example transaction layer packet (TLP) formats for use within an interconnect architecture, such as a PCIe-based interconnect architecture. Referring to FIG. 3A, an example of a PCIe transaction descriptor is illustrated. In one embodiment, transaction descriptor 300 is a mechanism for carrying transaction information. In this regard, transaction descriptor 300 supports identification of transactions in a system. Other potential uses include tracking modifications of default transaction ordering and association of transaction with channels.

Transaction descriptor 300 includes global identifier field 302, attributes field 304 and channel identifier field 306. In the illustrated example, global identifier field 302 is depicted comprising local transaction identifier field 308 and source identifier field 310. In one embodiment, global transaction identifier 302 is unique for all outstanding requests.

According to one implementation, local transaction identifier field 308 is a field generated by a requesting agent, and it is unique for all outstanding requests that require a completion for that requesting agent. Furthermore, in this example, source identifier 310 uniquely identifies the requestor agent within a PCIe hierarchy. Accordingly, together with source ID 310, local transaction identifier 308 field provides global identification of a transaction within a hierarchy domain.

Attributes field 304 specifies characteristics and relationships of the transaction. In this regard, attributes field 304 is potentially used to provide additional information that allows modification of the default handling of transactions. In one embodiment, attributes field 304 includes priority field 312, reserved field 314, ordering field 316, and no-snoop field 318. Here, priority sub-field 312 may be modified by an initiator to assign a priority to the transaction. Reserved attribute field 314 is left reserved for future, or vendor-defined usage. Possible usage models using priority or security attributes may be implemented using the reserved attribute field.

In this example, ordering attribute field 316 is used to supply optional information conveying the type of ordering that may modify default ordering rules. According to one example implementation, an ordering attribute of "0" denotes default ordering rules are to apply, wherein an ordering attribute of "1" denotes relaxed ordering, wherein writes can pass writes in the same direction, and read completions can pass writes in the same direction. Snoop attribute field 318 is utilized to determine if transactions are snooped. As shown, channel ID Field 306 identifies a channel that a transaction is associated with.

Figure 3B:
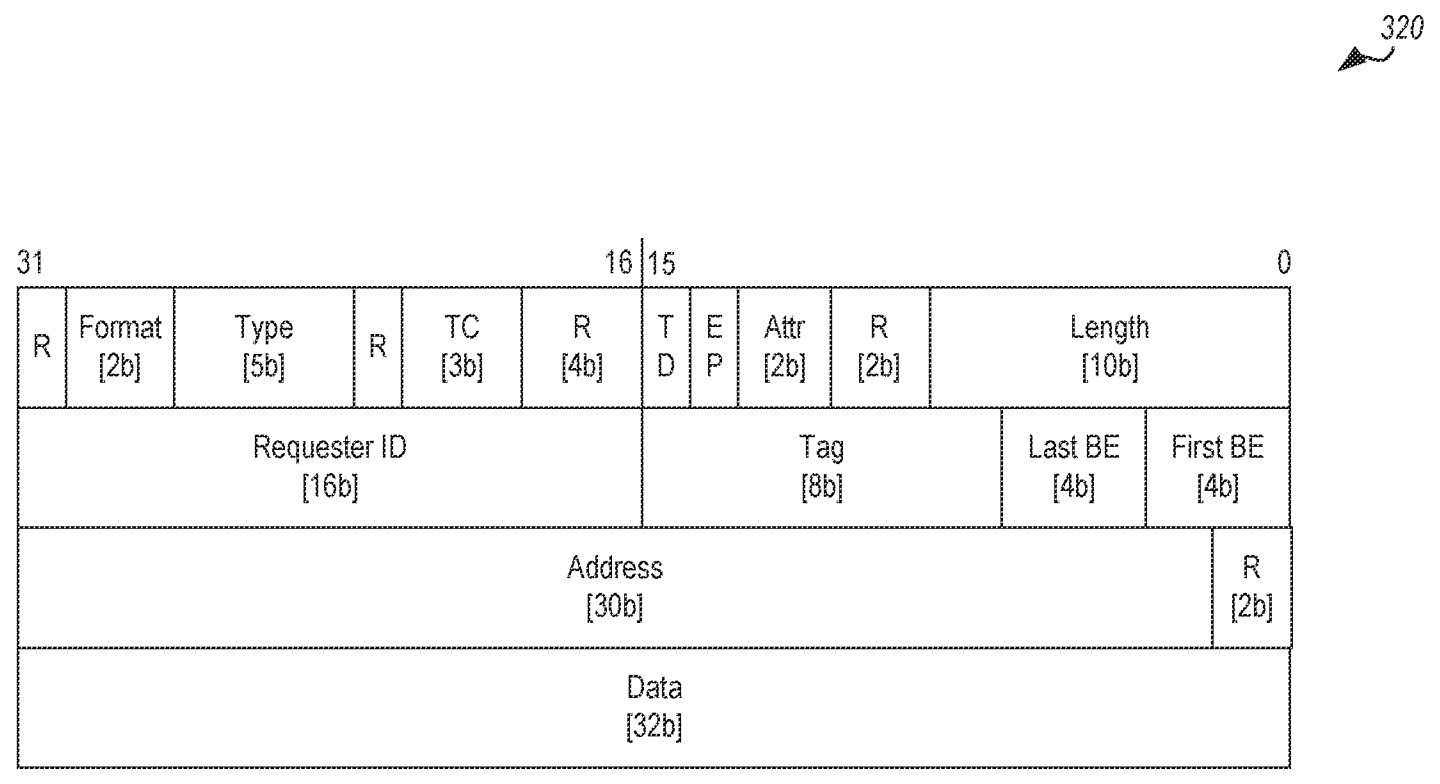

Referring to FIG. 3B, an example memory write request TLP format 320 is shown. The example memory write request TLP format 320 includes a number of Reserved (R) bits throughout. In addition, a Format (Fmt) field and Type field are included, and together, these fields may indicate that the TLP is a Memory Write Request. A Traffic Class (TC) field is included to indicate a certain traffic class or virtual channel (VC) for the request. A TLP Digest (TD) bit is included, which may indicate whether there extra CRC on the TLP data. A Length field indicates how much data the TLP includes (in this example, there is one doubleword (i.e., 32 bits) of data). A Requester ID field is included to indicate the sender of the TLP. A Tag field is also included for the sender to indicate certain data of the sender's choosing. A First Byte Enable (BE) field is included, and may allow for choosing which of the four bytes in the first data DW are valid, and should be written. In addition, a Last BE field is included, and may allow for choosing which of the four bytes in the last data DW are valid (in this example, there is only one DW of data, and this would be zero). An Address field is included to indicate the address to which the data is to be written, and finally, a Data field includes the data to be written in response to the memory write request. In some cases, a memory write request TLP may be a "posted" transaction that does not require a corresponding completion indication (e.g., a completion TLP).

Figure 3C:
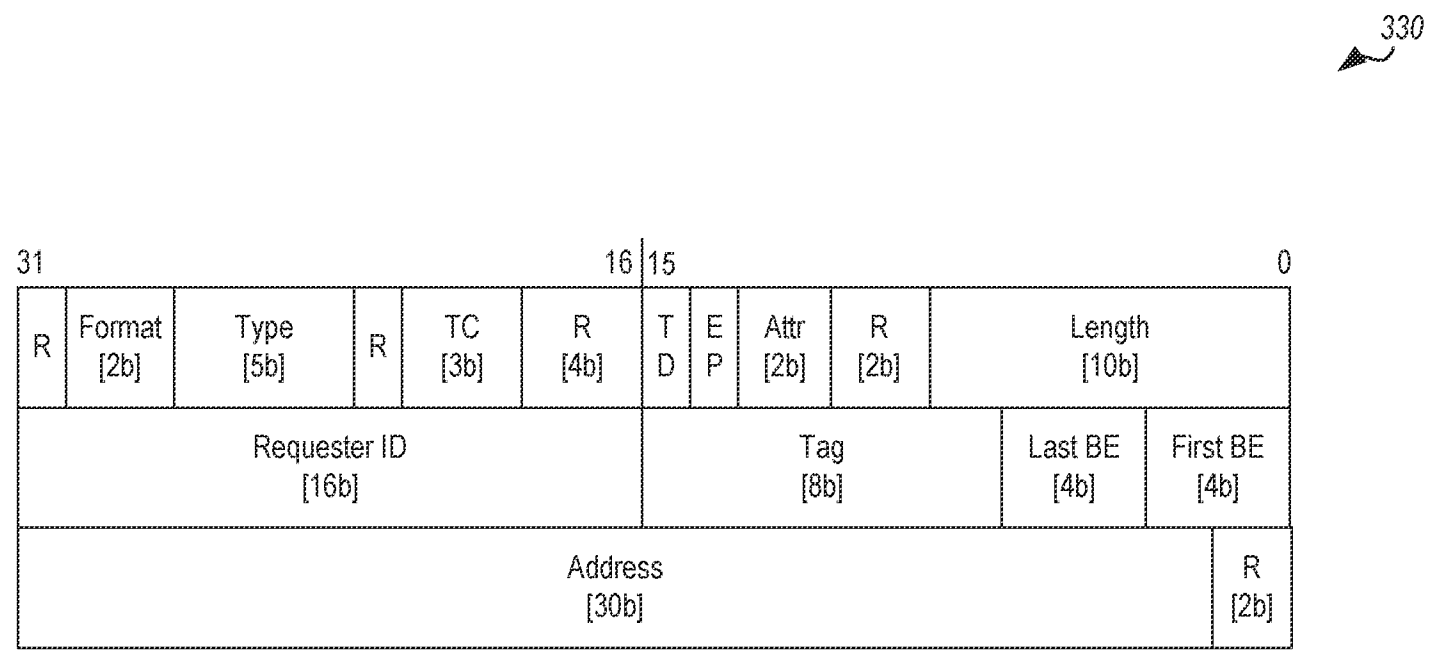

Referring to FIG. 3C, an example memory read request TLP format 330 is shown. The example format 330 is the same as the format 320 of FIG. 3B, but with the Data field removed. However, in the example format 330, the Format and Type fields now indicate that the packet is a memory read request, and the Length field indicates how many DWs of data are to be read in response to the TLP. Further, The two BE fields indicate the same as in format 320, except that they pick which bytes to read rather than which bytes to write. In some cases, a memory read request TLP may be a "non-posted" transaction that does require a corresponding completion indication (e.g., a completion TLP).

Referring to FIG. 3D, an example completion TLP format 340 is shown. A completion TLP may be sent by a completer in response to a non-posted type of transaction (e.g., a memory read request). In the example format 340, the Format and Type fields indicate that the TLP is completion type. The Length field indicates a number of DW of data in the TLP. The Completer ID field indicates the device completing the request (e.g., doing a read in response to a read request, e.g., a read request TLP formatted similar to 330), and the Requester ID indicates the device that initiated the request (e.g., the device that sent a read request TLP formatted similar to 330). The Byte Count field may indicate a number of valid payload bytes in the TLP. The Tag may indicate any value. The Lower Address field indicates the 7 least significant bits of the address in the associated request packet (e.g., the Address field in the memory read request TLP). The Status field may indicate a status of the completion, e.g., successful/unsuccessful. The BCM field may be used with PCI-X implementations, and otherwise may be zero.

Link Layer

Link layer 210, also referred to as data link layer 210, acts as an intermediate stage between transaction layer 205 and the physical layer 220. In one embodiment, a responsibility of the data link layer 210 is providing a reliable mechanism for exchanging Transaction Layer Packets (TLPs) between two components a link. One side of the Data Link Layer 210 accepts TLPs assembled by the Transaction Layer 205, applies packet sequence identifier 211, i.e. an identification number or packet number, calculates and applies an error detection code, i.e. CRC 212, and submits the modified TLPs to the Physical Layer 220 for transmission across a physical to an external device.

Physical Layer

In one embodiment, physical layer 220 includes logical sub block 221 and electrical sub-block 222 to physically transmit a packet to an external device. Here, logical sub-block 221 is responsible for the "digital" functions of Physical Layer 221. In this regard, the logical sub-block includes a transmit section to prepare outgoing information for transmission by physical sub-block 222, and a receiver section to identify and prepare received information before passing it to the Link Layer 210.

Physical block 222 includes a transmitter and a receiver. The transmitter is supplied by logical sub-block 221 with symbols, which the transmitter serializes and transmits onto to an external device. The receiver is supplied with serialized symbols from an external device and transforms the received signals into a bit-stream. The bit-stream is de-serialized and supplied to logical sub-block 221. In one embodiment, an 8b/10b transmission code is employed, where ten-bit symbols are transmitted/received. Here, special symbols are used to frame a packet with frames 223. In addition, in one example, the receiver also provides a symbol clock recovered from the incoming serial stream.

As stated above, although transaction layer 205, link layer 210, and physical layer 220 are discussed in reference to a specific embodiment of a PCIe protocol stack, a layered protocol stack is not so limited. In fact, any layered protocol may be included/implemented. As an example, an port/interface that is represented as a layered protocol includes: (1) a first layer to assemble packets, i.e. a transaction layer; a second layer to sequence packets, i.e. a link layer; and a third layer to transmit the packets, i.e. a physical layer. As a specific example, a common standard interface (CSI) layered protocol is utilized.

Figure 4:
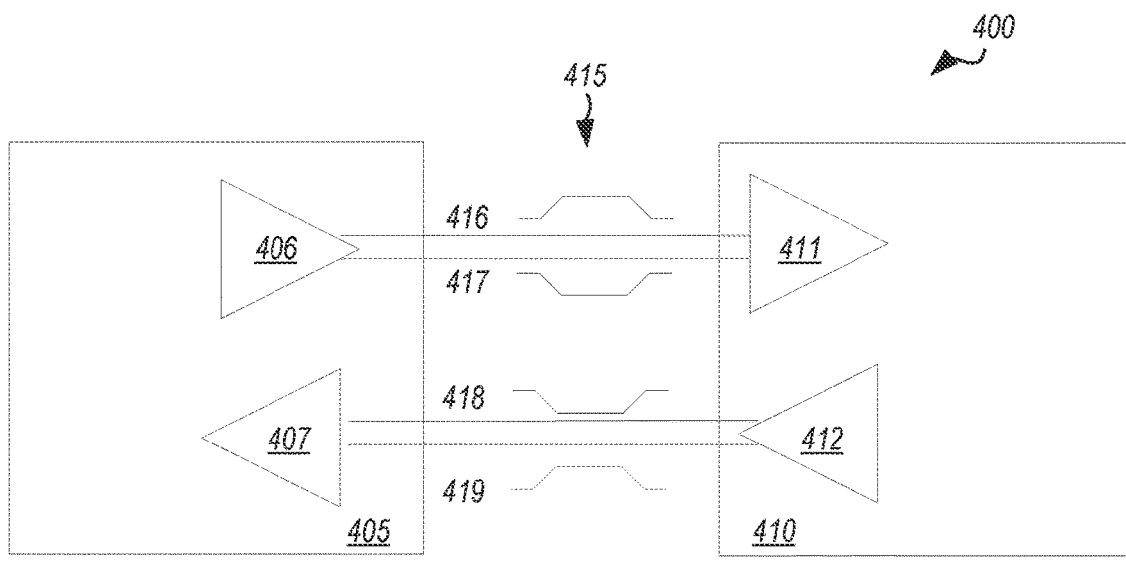
FIG. 4 illustrates an embodiment of a transmitter and receiver pair for an interconnect architecture.

Referring next to FIG. 4, an embodiment of a PCIe serial point to point fabric is illustrated. Although an embodiment of a PCIe serial point-to-point link is illustrated, a serial point-to-point link is not so limited, as it includes any transmission path for transmitting serial data. In the embodiment shown, a basic PCIe link includes two, low-voltage, differentially driven signal pairs: a transmit pair 406/412 and a receive pair 411/407. Accordingly, device 405 includes transmission logic 406 to transmit data to device 410 and receiving logic 407 to receive data from device 410. In other words, two transmitting paths, i.e. paths 416 and 417, and two receiving paths, i.e. paths 418 and 419, are included in a PCIe link.

A transmission path refers to any path for transmitting data, such as a transmission line, a copper line, an optical line, a wireless communication channel, an infrared communication link, or other communication path. A connection between two devices, such as device 405 and device 410, is referred to as a link, such as link 415. A link may support one lane—each lane representing a set of differential signal pairs (one pair for transmission, one pair for reception). To scale bandwidth, a link may aggregate multiple lanes denoted by xN, where N is any supported Link width, such as 1, 2, 4, 8, 12, 16, 32, 64, or wider. In some implementations, each symmetric lane contains one transmit differential pair and one receive differential pair. Asymmetric lanes can contain unequal ratios of transmit and receive pairs. Some technologies can utilize symmetric lanes (e.g., PCIe), while others (e.g., Displayport) may not and may even including only transmit or only receive pairs, among other examples.

A differential pair refers to two transmission paths, such as lines 416 and 417, to transmit differential signals. As an example, when line 416 toggles from a low voltage level to a high voltage level, i.e. a rising edge, line 417 drives from a high logic level to a low logic level, i.e. a falling edge. Differential signals potentially demonstrate better electrical characteristics, such as better signal integrity, i.e. cross-coupling, voltage overshoot/undershoot, ringing, etc. This allows for better timing window, which enables faster transmission frequencies.

A variety of interconnect architectures and protocols may utilize the concepts discussed herein. With advancements in computing systems and performance requirements, improvements to interconnect fabric and link implementations continue to be developed, including interconnects based on or utilizing elements of PCIe or other legacy interconnect platforms. In one example, Compute Express Link (CXL) has been developed, providing an improved, high-speed CPU-to-device and CPU-to-memory interconnect designed to accelerate next-generation data center performance, among other application. CXL maintains memory coherency between the CPU memory space and memory on attached devices, which allows resource sharing for higher performance, reduced software stack complexity, and lower overall system cost, among other example advantages. CXL enables communication between host processors (e.g., CPUs) and a set of workload accelerators (e.g., graphics processing units (GPUs), field programmable gate array (FPGA) devices, tensor and vector processor units, machine learning accelerators, purpose-built accelerator solutions, among other examples). Indeed, CXL is designed to provide a standard interface for high-speed communications, as accelerators are increasingly used to complement CPUs in support of emerging computing applications such as artificial intelligence, machine learning and other applications.

A CXL link may be a low-latency, high-bandwidth discrete or on-package link that supports dynamic protocol multiplexing of coherency, memory access, and input/output (I/O) protocols. Among other applications, a CXL link may enable an accelerator to access system memory as a caching agent and/or host system memory, among other examples. CXL is a dynamic multi-protocol technology designed to support a vast spectrum of accelerators. CXL provides a rich set of protocols that include I/O semantics similar to PCIe (CXL.io), caching protocol semantics (CXL.cache), and memory access semantics (CXL.mem) over a discrete or on-package link. Based on the particular accelerator usage model, all of the CXL protocols or only a subset of the protocols may be enabled. In some implementations, CXL may be built upon the well-established, widely adopted PCIe infrastructure (e.g., PCIe 5.0), leveraging the PCIe physical and electrical interface to provide advanced protocol in areas include I/O, memory protocol (e.g., allowing a host processor to share memory with an accelerator device), and coherency interface.

Figure 5:
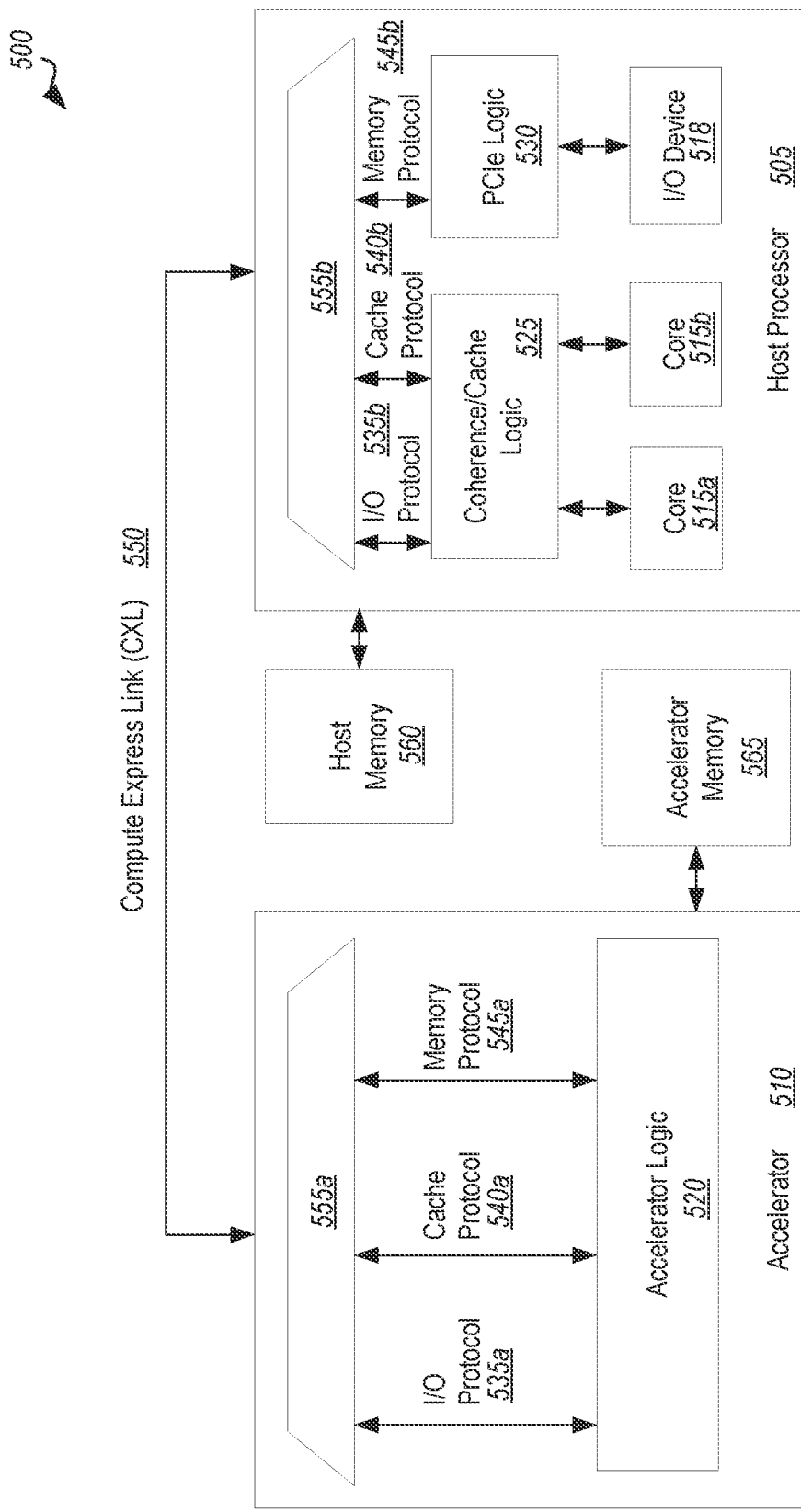
FIG. 5 illustrates an example implementation of a computing system including a host processor and an accelerator coupled by a link.

Turning to FIG. 5, a simplified block diagram 500 is shown illustrating an example system utilizing a CXL link 550. For instance, the link 550 may interconnect a host processor 505 (e.g., CPU) to an accelerator device 510. In this example, the host processor 505 includes one or more processor cores (e.g., 515*a-b*) and one or more I/O devices (e.g., 518). Host memory (e.g., 560) may be provided with the host processor (e.g., on the same package or die). The accelerator device 510 may include accelerator logic 520 and, in some implementations, may include its own memory (e.g., accelerator memory 565). In this example, the host processor 505 may include circuitry to implement coherence/cache logic 525 and interconnect logic (e.g., PCIe logic 530). CXL multiplexing logic (e.g., 555*a-b*) may also be provided to enable multiplexing of CXL protocols (e.g., I/O protocol 535*a-b* (e.g., CXL.io), caching protocol 540*a-b* (e.g., CXL.cache), and memory access protocol 545*a-b* (CXL.mem)), thereby enabling data of any one of the supported protocols (e.g., 535*a-b*, 540*a-b*, 545*a-b*) to be sent, in a multiplexed manner, over the link 550 between host processor 505 and accelerator device 510.

In some implementations, a Flex Bus™ port may be utilized in concert with CXL-compliant links to flexibly adapt a device to interconnect with a wide variety of other devices (e.g., other processor devices, accelerators, switches, memory devices, etc.). A Flex Bus port is a flexible high-speed port that is statically configured to support either a PCIe or CXL link (and potentially also links of other protocols and architectures). A Flex Bus port allows designs to choose between providing native PCIe protocol or CXL over a high-bandwidth, off-package link. Selection of the protocol applied at the port may happen during boot time via auto negotiation and be based on the device that is plugged into the slot. Flex Bus uses PCIe electricals, making it compatible with PCIe retimers, and adheres to standard PCIe form factors for an add-in card.

Figure 6:
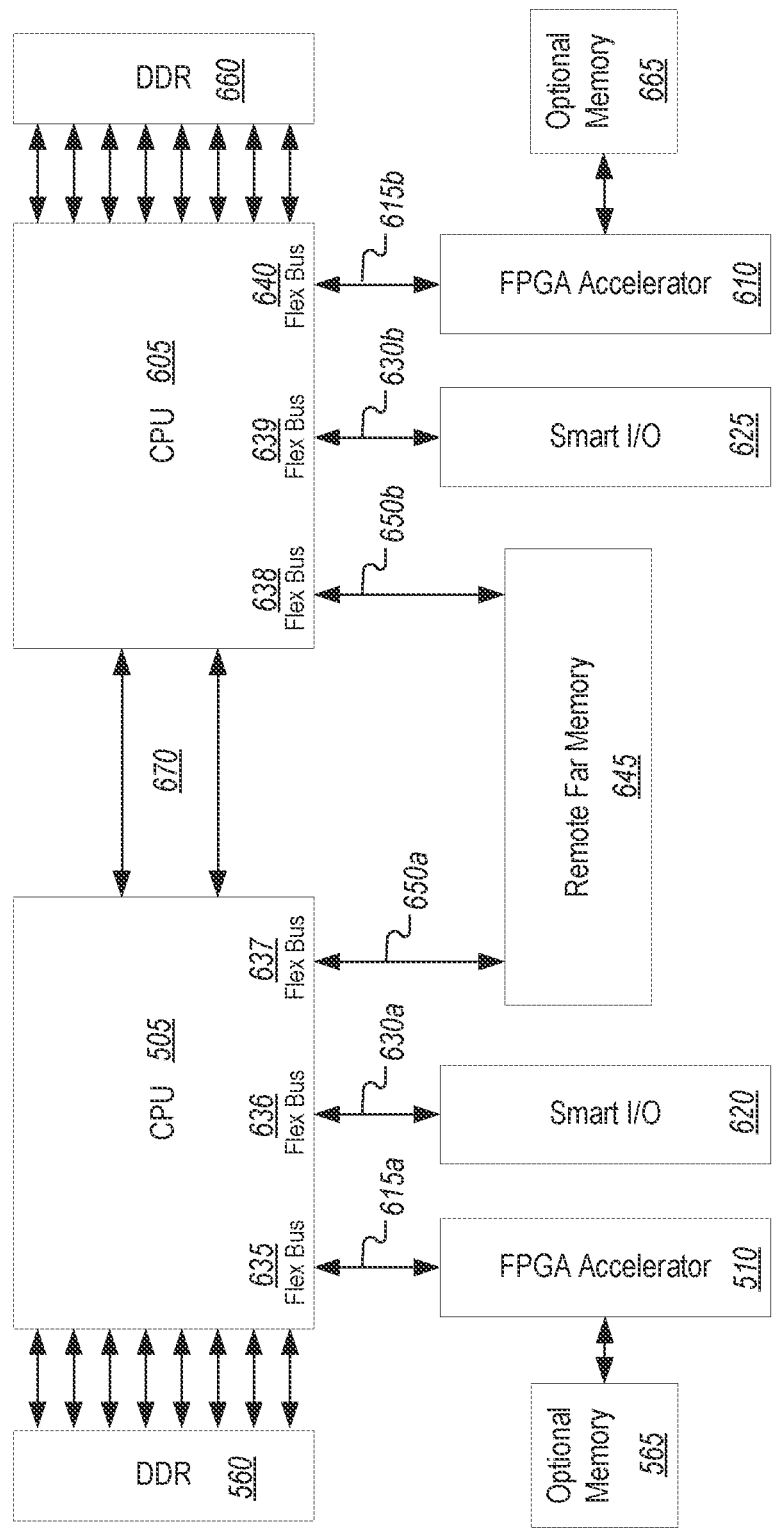
FIG. 6 illustrates an example implementation of a computing system including two or more interconnected processor devices.

Turning to FIG. 6, an example is shown (in simplified block diagram 600) of a system utilizing Flex Bus ports (e.g., 635-640) to implement CXL (e.g., 615*a-b*, 650*a-b*) and PCIe links (e.g., 630*a-b*) to couple a variety of devices (e.g., 510, 610, 620, 625, 645, etc.) to a host processor (e.g., CPU 505, 605). In this example, a system may include two CPU host processor devices (e.g., 505, 605) interconnected by an inter-processor link 670 (e.g., utilizing a UltraPath Interconnect (UPI), Infinity Fabric™, or other interconnect protocol). Each host processor device 505, 605 may be coupled to local system memory blocks 560, 660 (e.g., double data rate (DDR) memory devices), coupled to the respective host processor 505, 605 via a memory interface (e.g., memory bus or other interconnect).

As discussed above, CXL links (e.g., 615*a*, 650*b*) may be utilized to interconnect a variety of accelerator devices (e.g., 510, 610). Accordingly, corresponding ports (e.g., Flex Bus ports 635, 640) may be configured (e.g., CXL mode selected) to enable CXL links to be established and interconnect corresponding host processor devices (e.g., 505, 605) to accelerator devices (e.g., 510, 610). As shown in this example, Flex Bus ports (e.g., 636, 639), or other similarly configurable ports, may be configured to implement general purpose I/O links (e.g., PCIe links) 630*a-b* instead of CXL links, to interconnect the host processor (e.g., 505, 605) to I/O devices (e.g., smart I/O devices 620, 625, etc.). In some implementations, memory of the host processor 505 may be expanded, for instance, through the memory (e.g., 565, 665) of connected accelerator devices (e.g., 510, 610), or memory extender devices (e.g., 645, connected to the host processor(s) 505, 605 via corresponding CXL links (e.g., 650*a-b*) implemented on Flex Bus ports (637, 638), among other example implementations and architectures.

Figure 7:
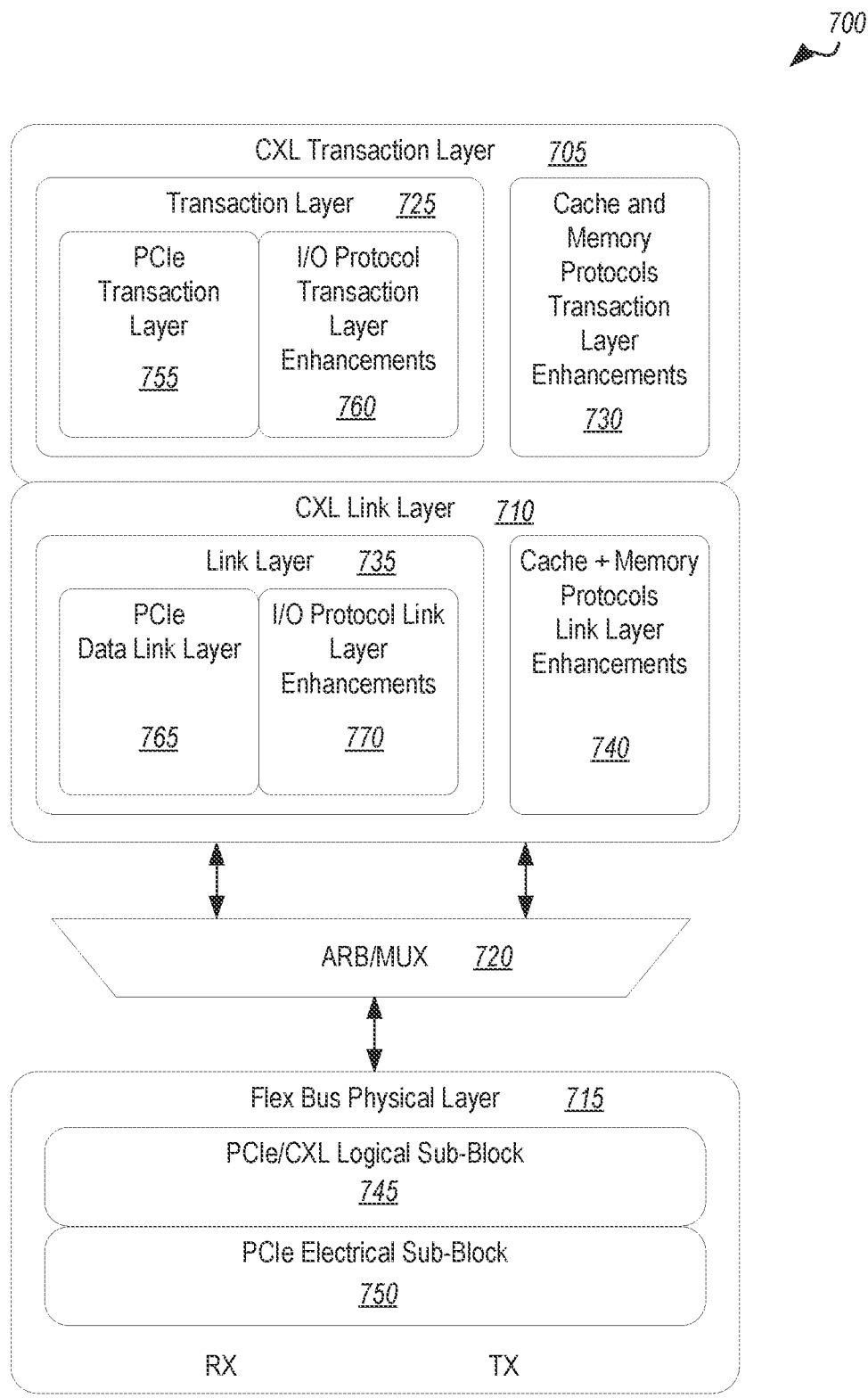
FIG. 7 illustrates a representation of an example port of a device including a layered stack.

FIG. 7 is a simplified block diagram illustrating an example port architecture 700 (e.g., Flex Bus) utilized to implement CXL links. For instance, Flex Bus architecture may be organized as multiple layers to implement the multiple protocols supported by the port. For instance, the port may include transaction layer logic (e.g., 705), link layer logic (e.g., 710), and physical layer logic (e.g., 715) (e.g., implemented all or in-part in circuitry). For instance, a transaction (or protocol) layer (e.g., 705) may be subdivided into transaction layer logic 725 that implements a PCIe transaction layer 755 and CXL transaction layer enhancements 760 (for CXL.io) of a base PCIe transaction layer 755, and logic 730 to implement cache (e.g., CXL.cache) and memory (e.g., CXL.mem) protocols for a CXL link. Similarly, link layer logic 735 may be provided to implement a base PCIe data link layer 765 and a CXL link layer (for CXl.io) representing an enhanced version of the PCIe data link layer 765. A CXL link layer 710 may also include cache and memory link layer enhancement logic 740 (e.g., for CXL.cache and CXL.mem).

Continuing with the example of FIG. 7, a CXL link layer logic 710 may interface with CXL arbitration/multiplexing (ARB/MUX) logic 720, which interleaves the traffic from the two logic streams (e.g., PCIe/CXL.io and CXL.cache/CXL.mem), among other example implementations. During link training, the transaction and link layers are configured to operate in either PCIe mode or CXL mode. In some instances, a host CPU may support implementation of either PCIe or CXL mode, while other devices, such as accelerators, may only support CXL mode, among other examples. In some implementations, the port (e.g., a Flex Bus port) may utilize a physical layer 715 based on a PCIe physical layer (e.g., PCIe electrical PHY 750). For instance, a Flex Bus physical layer may be implemented as a converged logical physical layer 745 that can operate in either PCIe mode or CXL mode based on results of alternate mode negotiation during the link training process. In some implementations, the physical layer may support multiple signaling rates (e.g., 8 GT/s, 16 GT/s, 32 GT/s, etc.) and multiple link widths (e.g., ×16, ×8, ×4, ×2, ×1, etc.). In PCIe mode, links implemented by the port 700 may be fully compliant with native PCIe features (e.g., as defined in the PCIe specification), while in CXL mode, the link supports all features defined for CXL. Accordingly, a Flex Bus port may provide a point-to-point interconnect that can transmit native PCIe protocol data or dynamic multi-protocol CXL data to provide I/O, coherency, and memory protocols, over PCIe electricals, among other examples.

The CXL I/O protocol, CXL.io, provides a non-coherent load/store interface for I/O devices. Transaction types, transaction packet formatting, credit-based flow control, virtual channel management, and transaction ordering rules in CXL.io may follow all or a portion of the PCIe definition. CXL cache coherency protocol, CXL.cache, defines the interactions between the device and host as a number of requests that each have at least one associated response message and sometimes a data transfer. The interface consists of three channels in each direction: Request, Response, and Data.

The CXL memory protocol, CXL.mem, is a transactional interface between the processor and memory and uses the physical and link layers of CXL when communicating across dies. CXL.mem can be used for multiple different memory attach options including when a memory controller is located in the host CPU, when the memory controller is within an accelerator device, or when the memory controller is moved to a memory buffer chip, among other examples. CXL.mem may be applied to transaction involving different memory types (e.g., volatile, persistent, etc.) and configurations (e.g., flat, hierarchical, etc.), among other example features. In some implementations, a coherency engine of the host processor may interface with memory using CXL.mem requests and responses. In this configuration, the CPU coherency engine is regarded as the CXL.mem Master and the Mem device is regarded as the CXL.mem Subordinate. The CXL.mem Master is the agent which is responsible for sourcing CXL.mem requests (e.g., reads, writes, etc.) and a CXL.mem Subordinate is the agent which is responsible for responding to CXL.mem requests (e.g., data, completions, etc.). When the Subordinate is an accelerator, CXL.mem protocol assumes the presence of a device coherency engine (DCOH). This agent is assumed to be responsible for implementing coherency related functions such as snooping of device caches based on CXL.mem commands and update of metadata fields. In implementations, where metadata is supported by device-attached memory, it can be used by the host to implement a coarse snoop filter for CPU sockets, among other example uses.

Flow Control and Source Ordering

PCIe defines three Flow-Control classes (FC) along with a set of ordering rules governing whether a subsequent transaction can, must, or must not bypass a prior transaction, if any, depending on the FC of each of these transactions and their attributes. The three FC are: Posted (P—e.g., memory writes) that do not need to get a completion, Non-Posted (NP—e.g., memory reads) that needs completion(s), and Completion (Cpl) which are completion(s) corresponding to an NP transaction.

Figure 8:
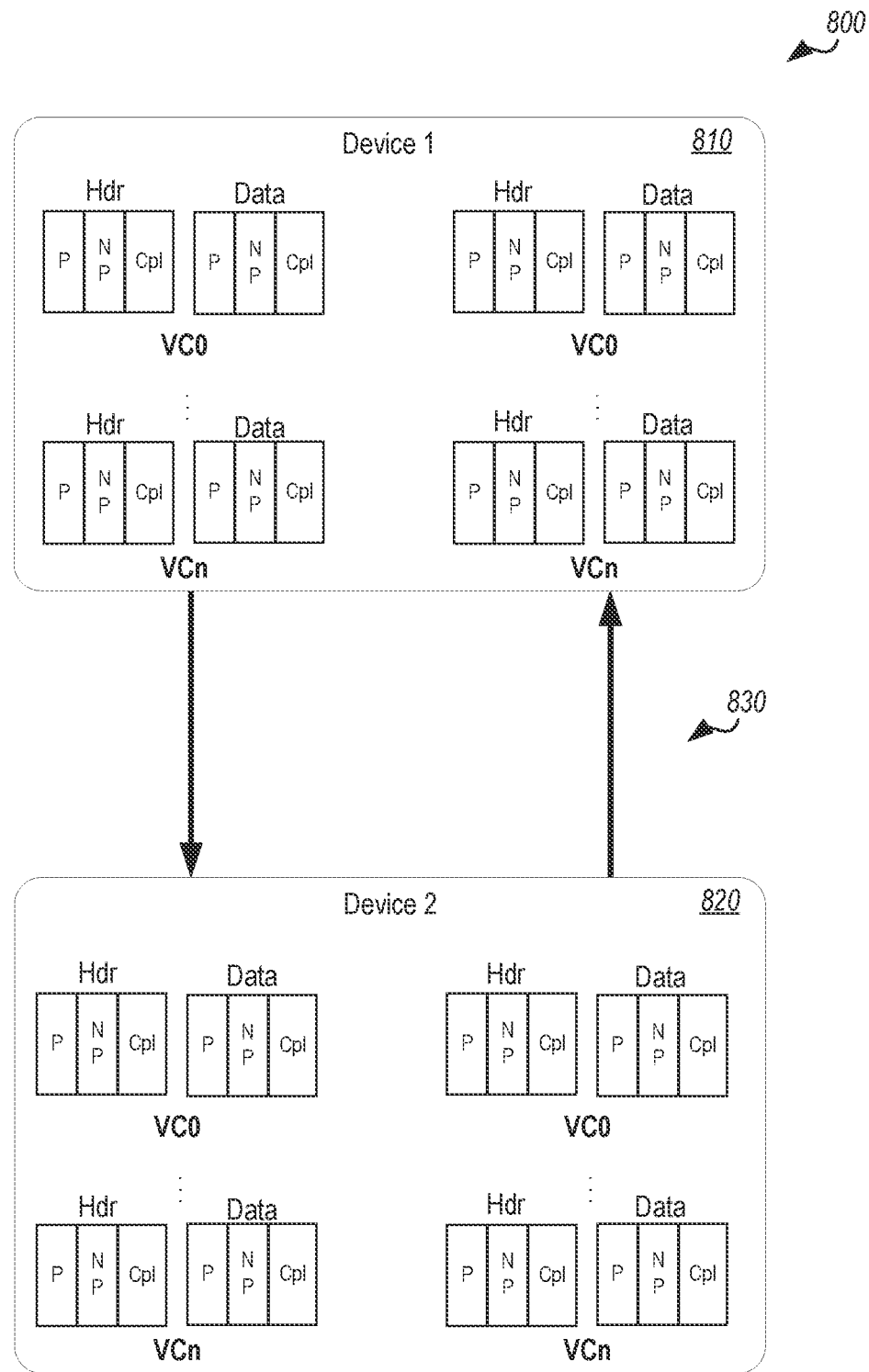
FIG. 8 illustrates an example system with PCIe link between devices.

FIG. 8 illustrates an example system 800 with PCIe Link 830 between devices 810, 820. In the example shown, the link 830 has a downlink and an uplink side, with each side comprising the FCs described above for each Virtual Channel (VC) of the up/downlink side. A virtual channel (VC) may generally refer to a mechanism in device interconnects, e.g., PCIe or CXL-based interconnects, that allows for traffic to be differentiated through the interconnect fabric using labels or indications in TLPs. For example, TLPs may include an indication in the traffic class (TC) field of the TLP, and software may provide a TC to VC mapping. Traffic may be associated with VCs by mapping TLPs with particular TC labels to corresponding VCs (e.g., on a 1:1 basis). A VC may be established when one or multiple TCs are associated with a physical VC resource designation (buffer). In many instances, the device interconnect may utilize a default TC or VC (e.g., VC0 in PCIe or CXL.io protocols).

In certain instances, traffic in each VC may be tracked using a separate set of data buffers that have separate flow control credits and counters. Accordingly, TLPs of different VCs may be subject to independent flow control systems, preventing TLPs belonging to one channel block the traffic of TLPs belonging to another. For instance, in the example shown, an independent accounting is maintained, for each VC, for the following buffers: (1) Posted Requests TLP's headers, (2) Posted Requests TLP's data, (3) Non-Posted Requests TLP's headers, (4) Non-Posted Requests TLP's data, (5) Completion TLP's headers, and (6) Completion TLP's data.

In some instances, TLPs may arrive in a different order than the order in which they were sent on the link. PCIe accordingly defines a set of ordering rules, some of which are shown in Table 1 below.

TABLE 1

Current PCIe-based Ordering Rules

| Row pass Col.? | Memory Write (Col. 2) | Split Read Request (Col. 3) | Split Write Request (Col. 4) | Completion (Col. 5) |
|---|---|---|---|---|
| Memory Write (Row A) | a) No<br>b) Y/N | Yes | Yes | a) Y/N<br>b) Yes |
| Split Read Request (Row B) | a) No<br>b) Y/N | Y/N | Y/N | Y/N |
| Split Write Request (Row C) | a) No<br>b) Y/N | Y/N | Y/N | Y/N |
| Completion (Row D) | a) No<br>b) Y/N | Yes | Yes | a) Y/N<br>b) No |

In Table 1, Memory Write represents Posted Transactions (P), Split Read Request and Split Write Request represent Non-Posted Transactions (NP), and Completion represents a Completion (Cpl or C). The entries in Table 1 indicate whether the transaction of the entry's corresponding row can bypass a transaction of the entry's corresponding column. For example, a Memory Write transaction (Row A) can typically not bypass another Memory Write transaction (Col. 2; but see below) and can bypass Split Read/Write Requests (Cols. 3/4). Similarly, A Completion transaction (Row A) can typically not bypass a Memory Write transaction (Col. 2) and can bypass Split Read/Write Requests (Cols. 3/4).

The "No" entries in Table 1 are intended to enforce the producer-consumer ordering paradigm. In this paradigm, a producer writes the data followed by a write of the flag. On seeing the modified value of the flag, the consumer can read the data. Thus, for instance, entry A2 of Table 1 indicates that no writes should bypass a prior write (A2a) except under the condition where the subsequent write has the "Relaxed Ordering" (RO) bit set (in the Attribute field of the TLP packet) or the two writes belong to two different sources when Identifier-based ordering (IDO) potentially in conjunction with process address space identifier (PASID), is deployed. Similarly, a completion is not allowed to bypass a prior write (D2a) in case the producer does the data write to memory and the flag write to its local memory. The consumer will read the flag which goes out as completion which must not pass the data write to enforce ordering. The exception (D2b) may occur when the write is a RO or the transactions belong to two different source (for write) and completor (completion) with ID-based Ordering (IDO). The "Yes" entries in the table are intended to ensure forward progress (e.g., avoiding deadlock). For example, a posted write (e.g., memory write) must be able to bypass a prior read or a completion. Since completion cannot bypass prior posted writes (see D2a), the posted write should not be stuck behind a NP that cannot be consumed due to Cpl being full.

However, existing PCIe ordering rules or models may have a number of drawbacks. For example, current rules might not work in a non-tree structure.

Figure 9:
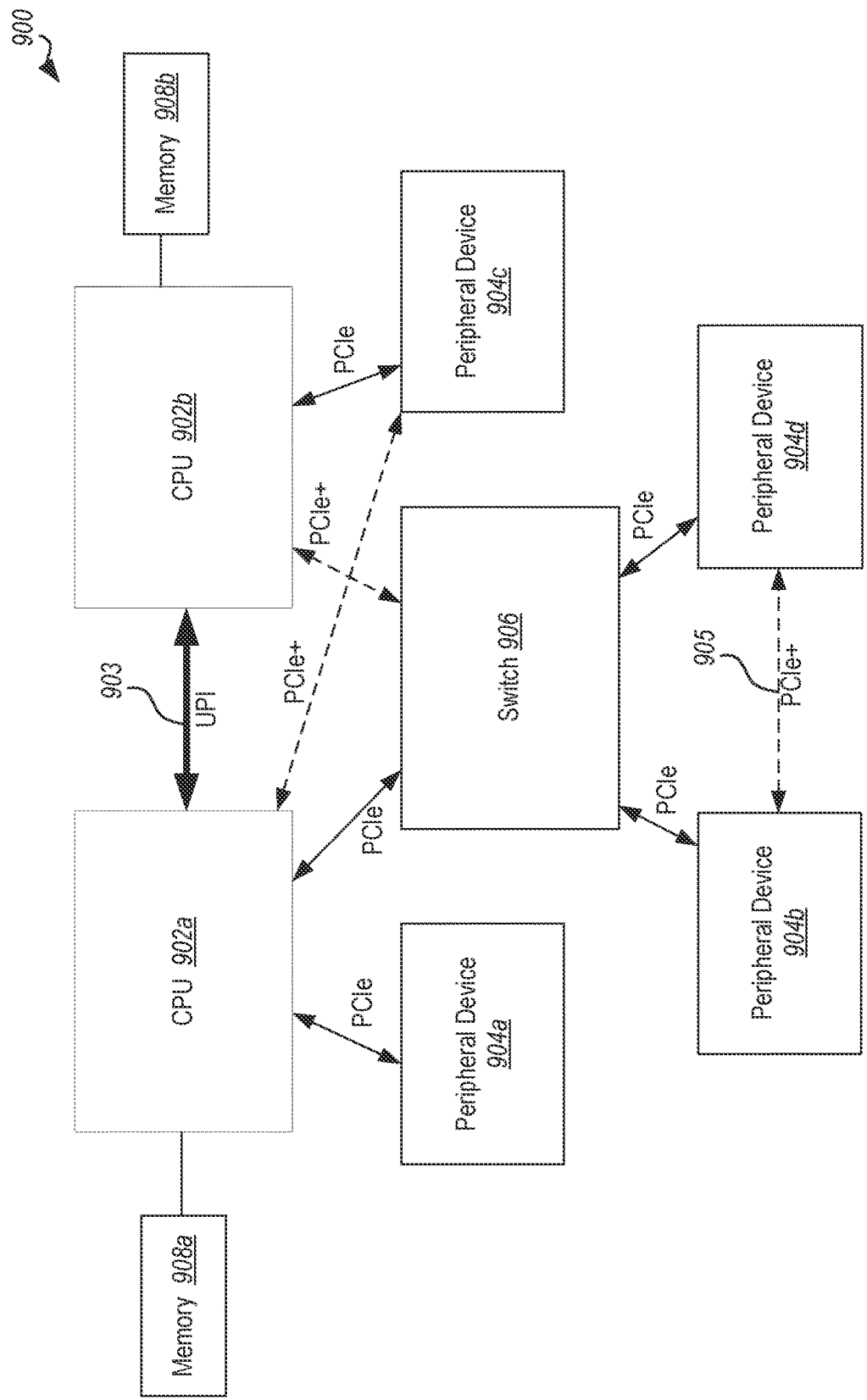
FIG. 9 illustrates an example system that includes a non-tree device structure.

FIG. 9 illustrates an example system 900 that includes a non-tree device structure. In particular, the example system 900 includes CPUs 902 coupled to one another through a processor interconnect 903 (e.g., UPI). Each CPU 902 is coupled to system memory 908. In addition, each CPU 902 is coupled to a number of peripheral devices 904 and a switch 906 through a device interconnect, which is PCIe-based in the example shown. In the example shown, the system 900 includes a number of links (PCIe) in a traditional tree structure (indicated by solid link lines in FIG. 9) and a number of links (PCIe+) that do not conform to the traditional tree structure (indicated by dashed lines in FIG. 9). The tree structure links may be supported by current PCIe-based protocols, while the non-tree structure links are not currently supported by PCIe-based protocols. However, the non-tree structure is an increasingly important usage model, and embodiments of the present disclosure may enable implementation of such non-tree structures in device interconnects.

As another example, for peer-to-peer (p2p) applications, PCIe and CXL devices under a CXL switch must go through a CPU for any access to a memory hosted by a CXL device under the switch.

Figure 10:
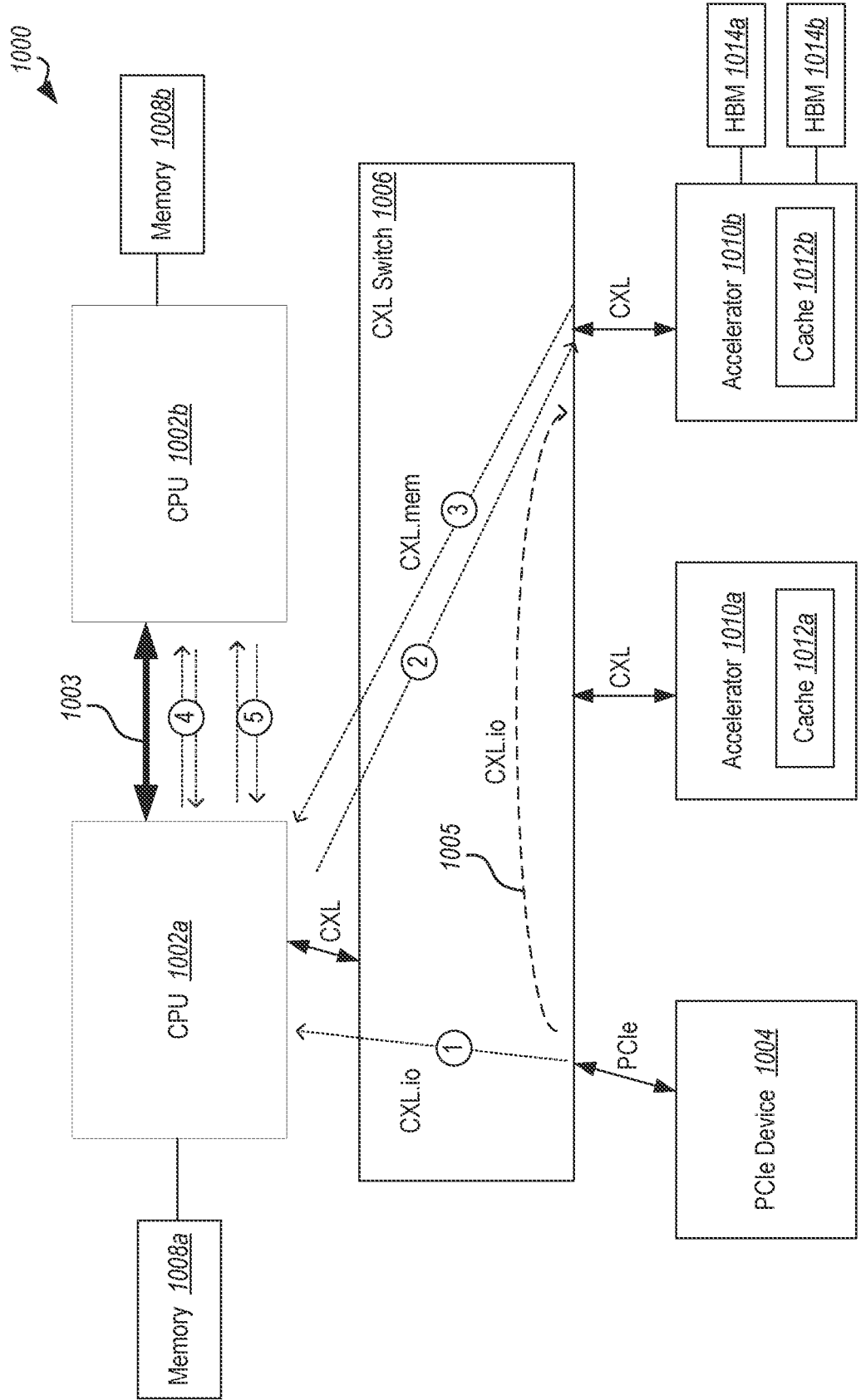
FIG. 10 illustrates an example system that includes devices coupled to CPUs through a CXL switch.

FIG. 10 illustrates an example system 1000 that includes devices (e.g., 1004, 1010) coupled to CPUs 1002 through a CXL switch 1006. The CPUs 1002 are coupled to one another through a processor interconnect 1003 (e.g., UPI). Each CPU 1002 is coupled to system memory 1008. The CPU 1002a is connected to the CXL switch 1006 via a CXL-based link, while the CXL switch 1006 connects to the PCIe device 1004 via a PCIe-based link and to accelerators 1010 via CXL-based links. In a scenario where the PCIe device 1004 would like to access memory hosted by the accelerator 1010b (e.g., in cache 1012b or high bandwidth memory (HBM) 1014a, 1014b), in current systems, the PCIe device 1004 would first need to go through the CPU 1002a (via the CXL switch 1006) as shown by dotted path 1. The CPU 1002a then accesses the memory on the CXL device via dotted paths 2 and 3 to perform the I/O access. The reason for this is that transactions to CXL memory are unordered, and sending the device writes using a CXL.io path 1005 between the device 1004 and the accelerator 1010b can cause producer-consumer ordering violations. For example, the PCIe device 1004 may write data to the Accelerator 1010b and then post the flag to the system memory, and the CPU may read the flag and access the data using CXL.mem semantics even though the data may still be in flight in the CXL.io path 1005. As a result, all transactions in current CXL systems are to be routed through the root port (e.g., in the processor). However, aspects of the present disclosure may allow for the PCIe device 1004 to directly access the memory attached to the accelerator 1010b (or another CXL device) without needing to go through the root port first.

Further, existing ordering models may cause storage inefficiency in the PCIe hierarchy as writes and reads/completions get serialized, and/or in the coherency fabric in the Root Port (e.g., inside the CPU as well as in the cache coherent link (such as interconnect 1003 connecting CPU sockets 1002)). Root Ports typically have a write cache (which may sometimes be referred to as "Wr$") to pipeline writes coming through the write-posting FIFO (WPF—posted). The root port may prefetch (RFO) an entry as soon as it enters the WPF, after getting any IOTLB translation done, to hide the write after write ordering requirement, if the address is to coherent space. That way, an entry at the head of the WPF can be immediately written to the write cache, assuming the ownership is obtained. This may involve two transactions inside the coherency fabric as well as the external link (e.g., interconnect 1003), if the address is on the other socket. For instance, an RFO (T1) may be followed by an ownership transfer (T2). This may be shown by dotted paths 4 in FIG. 10. After the memory write gets to the top of the WPF, the write cache performs write-back (T3) and relinquishes the cache line only after getting back the ack for the WB (T4). This is shown by dotted paths 5 in FIG. 10. If any entry in the write cache gets snooped out, the entire WPF stalls as the write corresponding to the entry that was snooped out gets to the head of the WPF and the write cache performs the RFO, T1, and T2 before it can process the next entry. Similarly, if the write is to non-coherent space, such as a peer-to-peer (P2P) access, a stall happens when the write is at the top of the WPF. The stall at the top of WPF causes the write bandwidth to drop in the PCIe interface. Another challenge may be that the write cache size and coherent fabric bandwidth demand (and thus, power consumption) goes up with the higher bandwidth in PCIe as the data rate continues to double every generation.

Some of the inefficiencies described above have previously been addressed through attributes such as RO and IDO. However, while RO and IDO may help improve efficiency in some instances, they still leave the usage models described with respect to FIGS. 9-10 (e.g., non-tree interconnects and CXL p2p) and their performance and/or storage shortfalls unaddressed.

Aspects of the present disclosure may overcome these or other limitations by allowing source ordering on a non-default (e.g., non-VC0) traffic channel in device interconnects (e.g., PCIe- or CXL-based device interconnects). The producer-consumer ordering model that exists may still be preserved generally. However, in certain embodiments, the source may need to enforce the global visibility of the data writes prior to writing the flag. The VC0 channel may continue to have traditional PCIe ordering rules (e.g., those in Table 1) but may be further augmented by a stream-based ordering in addition to IDO based ordering. For instance, in some embodiments, one or more source-ordered virtual channels may include request and response flow-control classes, where transactions are completed unordered, to enable alternate paths and/or optimizations for protocols such as CXL. In addition, in some embodiments, a stream identifier (Stream ID) based routing may be added to enhance the IDO-based ordering and completion coalescing attributes to be used with the Stream ID. Additional ordering on the above two may be included as well to implement some flavors of producer-consumer ordering. In this way, embodiments of the present disclosure may enable high bandwidth device interconnects with low storage and low power consumption.

In particular, certain embodiments of the present disclosure may implement one or more of the following rules. First, a non-default VC (e.g., a "non-0 VC", e.g., VC1 . . . VCn) may be enabled by software to carry the traffic for the transactions following the source-ordered model as described herein. Thus, devices must support more than one VC for this feature to work. Second, the non-0 VC carrying the traffic may implement two flow control classes of transactions: (1) "requests", which will map to the NP FC class, and (2) "completions", which will map to the Cpl FC class. A new set of write transactions (that are "Posted" (P) transactions under current PCIe specifications) may be mapped to the "request" class and hence mapped to the "NP" FC class, or to the "P" FC class but with completions being required. For example, traditional posted transactions (including, e.g., Memory Write transactions) in this new VC may have a "posted completion required" attribute set to 1b, or may utilize a new TLP encoding for a new class of "Streamed Writes" that require a completion. This new type of TLP may also include a "coalesce completion allowed" attribute value which, when set to 1b, allows a completer or any switching entity to combine multiple completions with the same stream ID (defined further below), Requestor ID (source), and PASID (if present) to be combined with a number being incremented. For simplicity and ease of validation, in some embodiments, one can map only Streamed Write transactions to be used here. If the existing Memory Write TLP type is used (instead of a new Streamed Write TLP type), then two upper bits in the tag field, two reserved bits, or a combination of 1 tag field bit and 1 reserved bit can be used for indicating the new source-ordered transaction type. In other cases, different TLPs with values (e.g., format and/or type values) indicating a TLP type different than the known Memory Write TLP can be created (e.g., 0101_1100 b for Streamed Write TLP with completion but no completion coalescing and 0101_1101 b for Streamed Write TLP with completion but completion coalescing enabled, e.g., in the PCIe 6.0 specification instead of 0100_0000 b for PCIe Memory Write TLPs). In this approach, the attribute fields (RO, IDO, NS) may be reserved for future use. Read transactions may follow the same format as before and are accordingly placed in the NP FC class.

Completion for traditional posted transactions (e.g., Memory Write transactions or Streamed Write transactions) arriving in the NP FC class are sent in the completion (Cpl) FC class from the completer to the requester. In some cases, a separate completion transaction Streamed Write Completion with a reserved type other than that for known completion values (e.g., 0000_1100 b instead of 0000_1010 b or 0100_1010 b for Cpl and CplD PCIe TLPs) may be created using the same 3 DW format, but using the "Byte Count" to indicate the number of completions due to coalescing (no coalescing means the count is 1) and the tag field to indicate the stream ID that is being completed. Unsuccessful completions use the same format as the regular completions (e.g., OHC field) and no coalescing is allowed. For successful completions, the lower address (LA) field may be Reserved whereas the unsuccessful completions would have the field populated with the lower address bits. In certain embodiments, a requester may be required to drain the completions in response to its request unconditionally. Similarly, a completer may be required to consume a Streamed Write transaction (if mapped to "P" (or NP Write, if the write is mapped to NP)) and generate an associated completion for it, if needed, as long as there is space in its outbound completion queue. This ensures forward progress in the system as there is only a NP (or P)→Cpl dependency and Cpl drains unconditionally.

In some embodiments no ordering is implemented between NP and Cpl FC classes and there is no ordering between transactions in each FC class. Thus, each transaction in the NP class will be effectively treated as "RO"=1.

A stream ID may be indicated in the tag field of each posted transaction. Multiple writes belonging to the data part of a transfer can have the same non-0 tag. A source device is permitted to set the completion coalescing attribute to 1b and track the number of outstanding transactions in a stream. When those complete, it can update the flag. The way producer-consumer ordering is enforced is the source ensures the data is globally observable by receiving the completion for all the data that belong to a stream Each device/component may have a capability structure that advertises support for the above features. Further, each device in a PCIe-based hierarchy between any source-destination pair must be capable of supporting the ordering rules described herein before software can turn the on. For example, referring to the example system 900 of FIG. 9, the PCIe switch 906, PCIe Device 904b, PCIe Device 904d, and CPUs 902 must all support this feature if PCIe Device 904b wants to apply the ordering rules described herein to DMA writes from PCIe Device 904b to system memory or a P2P to PCIe Device 904d either through the switch 906 or an alternate direct link 905 (e.g., PCIe+). However, still referring to the example system 900 of FIG. 9, if PCIe Device 904b wants to perform a P2P write to PCIe Device 904c, and the Device 904c does not support this feature, it must do the P2P through a VC (e.g., VC0) that follows the traditional PCIe ordering rules (e.g., those shown in Table 1).

A control and status configuration register set can be defined in each device that reports all outstanding transactions for any given destination (or all the destinations). A control register can indicate to quiesce new outstanding NP/P transactions to a given destination (or all destinations) and when all the already outstanding NP/P transactions receive the completion, to set the 'quiesce status' bit. The quiescing requirement can be relaxed to complete the current transfer associated with any scheduled stream ID in progress.

A device with multiple paths to a destination, such as the example switch 906 in the upstream direction to system memory through CPUs 902 in FIG. 9, can use a routing algorithm based on <Dest ID, PASID, Stream ID>. It can be a simple approach based on lower order bits of Stream ID (e.g., even Stream IDs go to CPU 0 and odd Stream IDs to CPU1) or more sophisticated such as an enable register of n bits to cover the <Dest ID, PASID, Stream ID> where a 1b in the corresponding enable bit position means that that bit contributes to the routing decision and all the contributing bits are then added with a modulo operation to decide the link number to send the transaction on. For example, if we select bits [0, 5, 8] of the DestID and bits 0, 5 of stream ID then the 5-bit entity {DestID[8], DestID[5], DestID[0], StreamID[5], StreamID[0]} will be used to determine the link number. If two links exist, then the XOR of these bits determine the link on which to send the transaction. If there are 3 Links, then the routing can be determined by (DestID[8]+DestID[5]+DestID[0]+StreamID[5]+StreamID[0]) mod 3.

Tables 2a-2b illustrate ordering and bypass tables in accordance with embodiments of the present disclosure. As shown, non-VC0 NP transactions as described herein can bypass other NP transactions as well as Cpl transactions, and non-VC0 Cpl transactions as described herein can bypass other Cpl transactions as well as NP transactions. In Table 2a, both the Memory Read and the new type of Memory Write (Streamed Write) are mapped to the NP FC. In Table 2b, the three existing FC classes are maintained and reads are separated out from writes.

TABLE 2A

Example PCIe-based Ordering Rules
(if new writes are mapped to NP)

| Row pass Col.? | NP FC | Cpl FC |
|---|---|---|
| NP FC | Permitted | Permitted |
| Cpl FC | Yes | Permitted |

TABLE 2B

Example PCIe-based Ordering Rules
if the new writes are mapped to P

| Row pass Col.? | PFC (Streamed Write) | NP FC | Cpl FC |
|---|---|---|---|
| P FC | Permitted | Permitted | Permitted |
| NP FC | Permitted | Permitted | Permitted |
| Cpl FC | Yes | Yes | Permitted |

The source-ordered channel described above can be enhanced somewhat so that the source does not need to wait for the completions of all the data prior to posting the flag ('Partially Source-Ordered'). In this mechanism, the {RO, IDO} attributes have the same meaning even for the newly defined memory write transactions. The ordering rules of Table 2 will be tightened somewhat, as shown in Table 3 below. Other than that the set of rules delineated earlier apply.

TABLE 3

Other Example PCIe-based Ordering Rules

| Row pass Col.? | NP FC Memory Writes (Posted) | Memory Reads (Non-Posted) | Cpl FC |
|---|---|---|---|
| NP FC Memory Writes (Posted) | Permitted/No[1] | Permitted/No[2] | Permitted |
| Memory Reads (Non-Posted) | Permitted/No[3] | Permitted | Permitted |
| Cpl FC | Permitted | Permitted | Permitted |

The notes in Table 3 are as follows: (1) A Memory Write with RO=0b cannot bypass a prior memory write with the same <Requester ID, PASID (if present), Stream ID>. The Flag write can have the RO=0b and data can have the RO=1b; (2) A Memory Read cannot bypass a prior memory write with overlapping addresses from the same <Requester ID, PASID (if present)>. This ensures that read gets the last write; and (3) A Memory Write with RO=0b cannot bypass a prior memory read with the same <Requester ID, PASID (if present), Stream ID>. This ensures stronger ordering beyond producer-consumer.

The ordering rules of Table 3 may allow for a device to write data/flag to system memory as well any memory-mapped I/O accesses that occur as peer-to-peer (P2P) over a root port as part of the same stream ID. All coherent memory practically are the same destination since the root port handles the global observability by accessing its local cache. Any P2P access is also handled by the root-port— once it is placed in the outbound NP FC in the egress PCIe Link, the ordering is committed. Thus, a first device can write data in the system memory and/or the memory in a second device as RO writes and then send flag with RO=0b. The root-port will ensure that all prior writes from the same <Req ID, PASID, Stream ID> to the system memory are globally visible and any P2P writes get the completion. An example of this scenario is described further below with respect to FIG. 11 below.

If the data/flag combination from the device is a mix of some accesses through the root-port, as described above, and some accesses through P2P that do not go through the CPU (e.g., PCIe Device 904b to PCIe Device 904d in FIG. 9 or the CXL.io path 1005 in FIG. 10), the requestor can still take advantage of the optimization for the root-port side as well as any other entity such as a switch that provides the optimization immediately above separately and wait for the final completion from both, before committing the flag.

A new type of ordering not supported by traditional PCIe, but very important from a computing point of view due to the note/restriction 3 in Table 3 above, as shown in Tables 4-6 below.

In the example scenario shown in Table 4 below, memory locations A and B initially have the values a and b stored therein before the instructions shown are executed. The value of location A may represent "data" while the value of the location B may represent a "flag" indicating the write of data to A is complete. Legal outcomes of reads in this scenario are (a, b), (a', b), and (a', b'), while (a, b') would not be a legal outcome as write requests cannot generally bypass other write requests. Thus, if Device 2 reads b' (i.e., the updated flag), it is guaranteed to read a' (i.e., the updated data). This scenario may represent a typical producer-consumer model for passing data.

TABLE 4

| Device 1 | Device 2 |
|---|---|
| 1) Wr A, a' | 1) Rd B |
| 2) Wr B, b' | 2) Rd A |

In the example scenario shown in Table 5 below, memory locations A and B initially have the values a and b stored therein before the instructions shown are executed. Legal outcomes of read in this scenario are (a, b'), (a', b), and (a', b'), while (a, b) would not be a legal outcome as read requests cannot generally bypass write requests. In this scenario, two processes may use A and B as indications of completions and may suspend themselves so that the later process can wake up the earlier process for rendezvous. Thus, (a, b) would mean both processes will wait on the other and never come up. Though this may not represent a typical producer-consumer model for passing data, this may be supported through certain PCIe ordering rules.

TABLE 5

| Device 1 | Device 2 |
|---|---|
| 1) Wr A, a' | 1) Wr B, b' |
| 2) Rd B | 2) Rd A |

In the example scenario shown in Table 6 below, memory locations A and B initially have the values a and b stored therein before the instructions shown are executed. Legal outcomes of read in this scenario are (a, b), (a', b), and (a, b'), while (a', b') would not be a legal outcome. This scenario may represent a traditional semaphore to enter a critical region, and PCIe implementations will not enforce this through current ordering rules. However, aspects of the present disclosure may allow this scenario, e.g., where the devices use the same Stream ID (as described above).

TABLE 6

| Device 1 | Device 2 |
|---|---|
| 1) Rd B | 1) Rd A |
| 2) Wr A, a' | 2) Wr B, b' |

In many instances, embodiments of the present disclosure may help reduce the bandwidth consumption in the root port of a PCIe-based interconnect (e.g., the internal fabric inside the CPU) as well as on the CPU-CPU link, while delivering additional performance.

Figure 11:
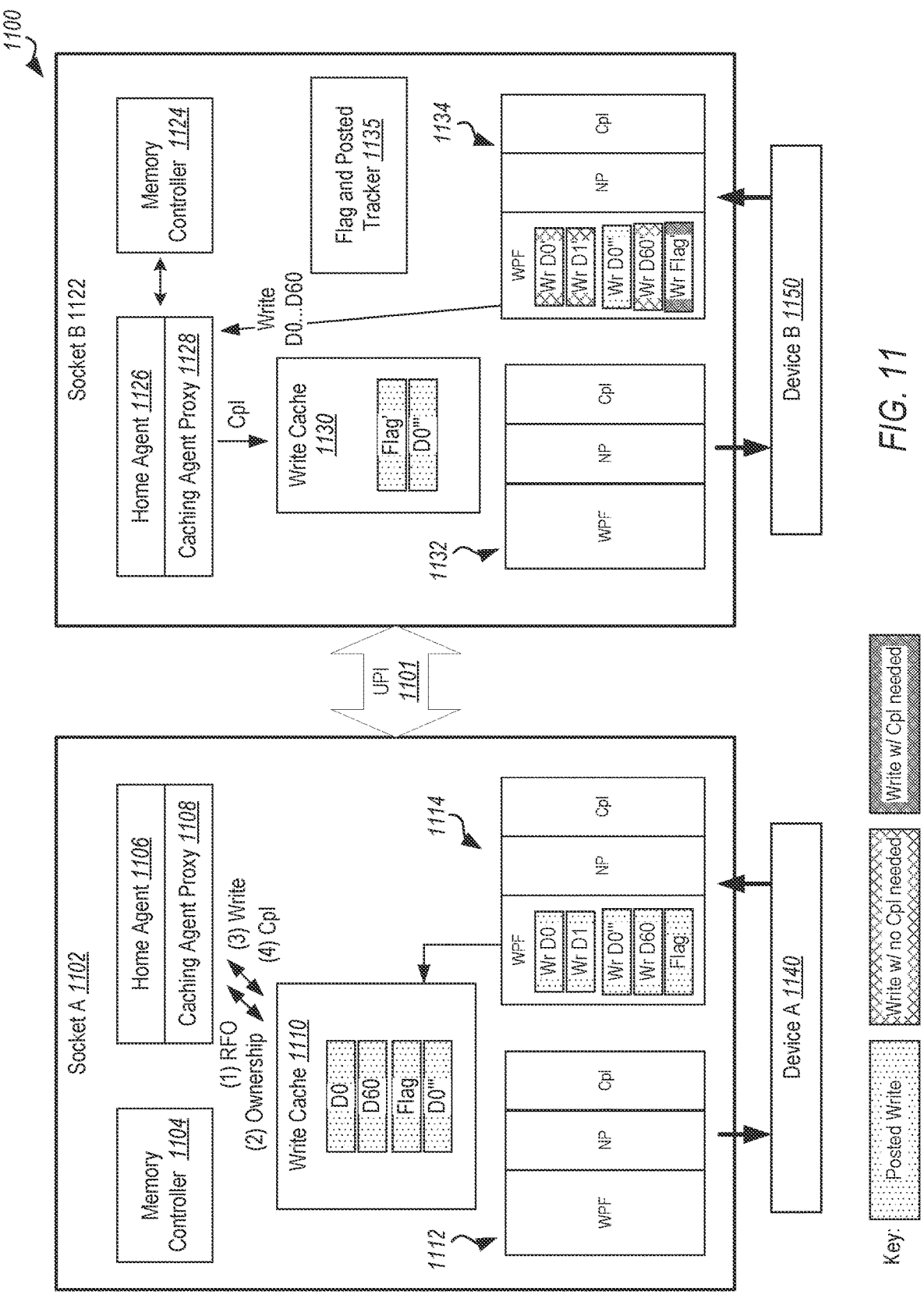
FIG. 11 illustrates an example system that implements source ordering rules in accordance with embodiments of the present disclosure.

FIG. 11 illustrates an example system 1100 that implements source ordering rules in accordance with embodiments of the present disclosure. The example system 1100 includes two processor sockets 1102, 1122 coupled via a UPI 1101. Each socket includes a memory controller (e.g., 1104, 1126), home agent (e.g., 1106, 1126), caching agent proxy (e.g., 1108, 1128), write cache (e.g., 1110, 1130), and flow control buffers (e.g., 1112 (downlink), 1114 (uplink), 1132 (downlink), 1134 (uplink)). The socket 1102 is connected to the device 1140 through a link based on load-store input/output (I/O) protocol or memory mapped I/O protocol (e.g., PCIe protocol, CXL.io protocol, or another type of load-store I/O protocol), and the socket 1122 is connected to the device 1150 through another load-store I/O or memory mapped I/O-based link. The left side of FIG. 11 illustrates an example of current PCIe-based ordering rules applied to transactions from the device 1140, while the right side of FIG. 11 illustrates PCIe-based ordering rules in accordance with the present disclosure applied to transactions from the device 1150.

Under current PCIe-based ordering rules, each of the data cache lines D0 through D60 as well as the Flag has an entry in the write cache 1110. Each write has a request for ownership (RFO) from the write cache 1110 to the local caching agent proxy 1108/home agent 1106 (and possibly on UPI 1101), which gets a Ownership response back. After the write in the write cache 1110, the write cache 1110 performs the write back (WB) to the local caching agent proxy 1108/home agent 1106 (and possibly on UPI 1101), which then gets a completion for WB (Cmpl). The cache line is then released from the write cache 1110. Thus, under the current ordering rules, each write that touches a cache line generates four transactions, assuming no snoops or conflicts.

In contrast, with embodiments of the present disclosure, only the Flag and different data (e.g., D0''' which may be sent under traditional ordering rules) need an entry in the write cache 1130. The Flag and different data may follow the 4-transaction flow described above, as they have their RO=0. All the data with the D0', D1', . . . D60', with RO=1 in the special, non-0 VC, will be delivered directly to the destination Home Agent (e.g., local home agent 1126, but may also be a remote home agent, e.g., home agent 1106 of Socket 1102) or to a P2P destination, requiring a write followed by a completion. Thus, only two transactions are needed in this scenario with the proposed ordering rules. The completions can be combined, amortizing the completions with the same Stream ID. All these transactions may be tracked in a separate structure, such as the Flag and Posted Tracker 1135. The Flag write would have been prefetched by the time the write goes to the head of the WPF of the buffer 1134. If all the prior write transactions with the same stream ID (e.g., Req ID, PASID) have not been completed, the write can be moved aside to the tracker 1135 so that subsequent posted transactions are not throttled. Once the Flag write is completed, the completion for all 62 transactions can be sent to the requestor as one completion (i.e., byte count field=62).

Referring again to FIG. 10, if the PCIe device 1004 is a legacy PCIe device and the CXL switch 1006 needs to convert traffic from the PCIe device 1004 into CXL.io traffic destined to a CXL device or send out in the new unordered non-0 VC as described herein to a PCIe device or another switch that has the new, non-0 VC all the way to a destination PCIe/CXL device, there may be two alternative sets of rules that can be used to ensure the traditional producer-consumer ordering model can still be enforced even when data and flag are in different destinations. It should be noted that both sets of rules can be implemented simultaneously, as long as one set is applied to a stream.

A first set of rules includes the following. If the posted transaction is a RO (=1b) transaction or IDO based ordering, the transaction is sent on the new non-0 VC (or on CXL.io) using non-posted semantics. The switch (e.g., 1006) tracks the number of outstanding transactions on a per Requester ID/PASID (if used) basis if IDO is used or just the number of outstanding transactions if RO is used. If a posted transaction with RO=0b and IDO=0b comes up, the switch may ensure that all prior outstanding posted transactions it has from the non-0 VC have completed. The switch may be permitted to move this transaction to a side queue (e.g., similar to the Flag and Posted Tracker 1135 of FIG. 11) to allow subsequent transactions to bypass, if allowed by the PCIe ordering rules (e.g., those in Table 1 above). If a posted transaction with RO=0b and IDO=1b comes up, the switch may ensure that all prior outstanding posted transactions in the non-0 VC from the same source have completed. The switch may be permitted to move this transaction to the side queue to allow subsequent transactions to bypass, if allowed by the PCIe ordering rules (e.g., those in Table 1 above). Any non-posted or completion transaction has to ensure that all applicable outstanding transactions in the non-0 VC have completed, consistent with the rules of Table 1.

While the above rules scale well, since the switch has to wait for all prior writes to complete before forwarding, it can result in performance degradation. For example, referring again to FIG. 10, if the PCIe device 1004 sends out writes with RO=0 and IDO=0, then each write will get stalled until a completion is received before moving on to the next write.

Accordingly, the following mechanism can be adopted in certain instances. Software may enable this mechanism if the switch and all the devices (including the host processor) can forward the traditional PCIe/CXL.io writes to support this mechanism. First, any write with the traditional producer-consumer semantics may be forwarded as-is to the destination (e.g., in FIG. 10, VC0 Memory writes coming from the PCIe device 1004 will be forwarded to Accelerator 1010b using CXL.io in the non-0 VC) with the producer-consumer semantics. The write will have a non-0 tag that the switch ingress port will track. The target device (e.g., Accelerator 1010b) may send a completion back for the write using a Cpl Posted command in VC1 with the original TC (e.g., TC0) that the switch needs to intercept and terminate, marking the completion of the outstanding write. In some cases, the Attribute field with RO=1 may be used since a Memory Write with completion has the Attribute field reserved.

Any write or completion or non-posted transaction that goes to a different destination that needs to be ordered with respect to prior posted transactions (which are still outstanding from a different destination) can be forwarded to its new destination with a non-0 tag indicating that it has to wait for a follow-up write in the new, non-0 VC before committing to global observability. This ensures that the receiving port (e.g., root port) can do other processing (e.g., IOTLB translation, RFO, wait for prior writes to be committed) until the commit arrives.

The switch may send a Memory Write with completion in the new, non-0 VC using the tag of the posted write above after receiving all prior completions. This indicates to the destination of the write that it can be committed for global visibility. The write destination must consume this Memory Write with completion unconditionally and not block subsequent writes in that channel. This avoids creating a dependency with the Posted (P) FC in a different channel.

Each device may advertise how many of such Memory Write with completion it can consume unconditionally (e.g., each entry can be implemented as a 2-bit vector: one to track if the tag has come in the new, non-0 VC and the other for scheduling a completion back, as defined above). The switch may be programmed to stay within that limit for each destination. The Memory Write in the traditional Posted (P) FC can be made globally observable if the corresponding Memory Write with completion has arrived. After that, the device schedules a completion back to the switch, using the same transaction as above. Any completion or non-posted that goes to a different destination that needs to be ordered with respect to prior posted transactions, has to wait until the completions arrive.

Figure 12:
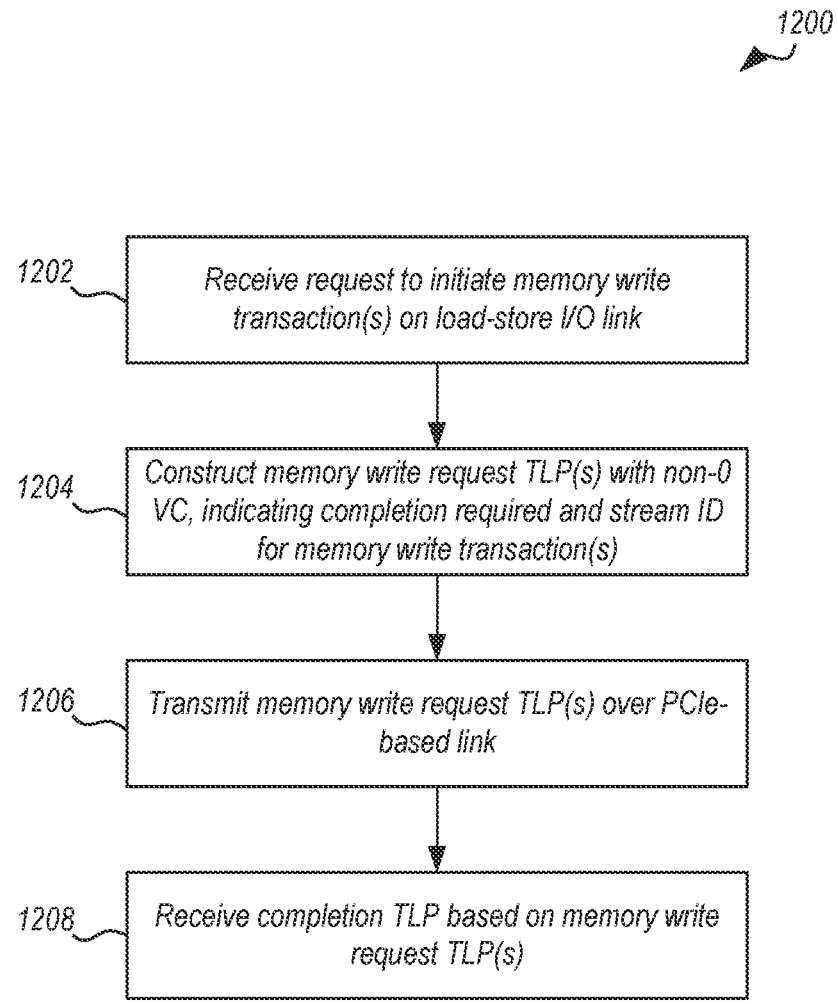
FIG. 12 illustrates a flow diagram of an example process of constructing memory write request TLPs in accordance with embodiments of the present disclosure.

FIG. 12 illustrates a flow diagram of an example process 1200 of constructing memory write request TLPs in accordance with embodiments of the present disclosure. Operations in the example processes may be performed by hardware components (e.g., protocol stack circuitry) of a device that transmits or receives data packets over a link (e.g., PCIe TLPs or other types of data packets). In some embodiments, a computer-readable medium may be encoded with instructions (e.g., a computer program) that implement one or more of the operations in the example processes. The example processes may include additional or different operations, and the operations may be performed in the order shown or in another order. In some cases, one or more of the operations shown in FIG. 12 are implemented as processes that include multiple operations, sub-processes, or other types of routines. In some cases, operations can be combined, performed in another order, performed in parallel, iterated, or otherwise repeated or performed another manner.

At 1202, a request to initiate one or more memory write transactions on a device interconnect link is received. As used herein, a memory write transaction may refer to a write transaction in a load-store input/output (I/O) protocol or memory mapped I/O protocol (e.g., PCIe protocol, CXL.io protocol, or another type of load-store I/O protocol). For example, the memory write transaction may be a PCIe-based Memory Write transaction or a Streamed Write transaction as described above.

At 1204, memory write request TLP(s) are constructed based on the memory write transaction(s). The memory write request TLP(s) indicates, in fields of the TLP(s), a virtual channel (VC) other than VC0 (a non-0 VC), that a completion is required in response to the memory write transaction, and a stream identifier (stream ID) associated with the memory write transaction(s). The stream ID may indicate a particular data stream between two devices, i.e., multiple memory write request TLPs may indicate the same stream ID. The memory write request TLP may be formatted as a Memory Write TLP type or a Streamed Write TLP type, for example.

In some embodiments, the indication that a completion is required in response to the memory write transaction is included in two upper bits of a tag field of the memory write request TLP, two reserved bits of the memory write request TLP, or a combination of 1 tag field bit and 1 reserved bit of the memory write request TLP. In some embodiments, the indication that a completion is required in response to the memory write transaction is included in one or more fields (e.g., the format and/or type fields) of the memory write request TLP (e.g., with a value of 0101_1100b for Memory Write with completion but no completion coalescing and 0101_1101b for Memory Write with completion but completion coalescing enabled). In some embodiments, the stream identifier is indicated in a tag field of the memory write request TLP. In some embodiments, the memory write request TLP further includes a field indicating that completion coalescence is allowed (e.g., the completer may send one completion for multiple memory write request TLPs associated with the same stream ID).

At 1206, the memory write request TLP(s) are transmitted over the PCIe-based link. The memory write request TLP(s) may be tracked by the sending and receiving device on the link using a non-posted transaction type buffer, e.g., the "NP" buffer shown in FIG. 8 and described above, versus the posted transaction type buffer with which memory write requests are typically tracked.

At 1208, a completion TLP is received based one/in response to the memory write request TLP(s) transmitted at 1206. One or more fields of the completion TLP indicate that the completion TLP is associated with a memory write request. For example, the format and/or type field of the completion TLP may indicate a value of 0000_1100b, saying that this is a completion for a transaction that is typically a "posted" transaction (such as, e.g., a memory write transaction in PCIe or CXL interconnect environments). In some embodiments, the completion TLP indicates completions for the first and second memory write request TLPs. For example, tag field of the completion TLP may indicate the stream identifier associated with a plurality of memory write request TLPs (e.g., those with the same stream ID), and/or a byte count field of the completion TLP may indicate a number of completions indicated by the completion TLP.

The foregoing disclosure has presented a number of example techniques for implementing efficient source ordering in PCIe-based interconnects. It should be appreciated that such techniques may be applied to other interconnect protocols. For instance, while some of the techniques discussed herein were described with reference to PCIe- or CXL-based protocols, it should be appreciated that techniques may apply to other interconnect protocols, such as OpenCAPI™, Gen-Z™, UPI, Universal Serial Bus, (USB), Cache Coherent Interconnect for Accelerators (CCIX™), Advanced Micro Device™'s (AMD™) Infinity™, Common Communication Interface (CCI), or Qualcomm™'s Centriq™ interconnect, among others, or to other types of packet-based protocols.

Note that the apparatus', methods', and systems described above may be implemented in any electronic device or system as aforementioned. As specific illustrations, the figures below provide exemplary systems for utilizing embodiments as described herein. As the systems below are described in more detail, a number of different interconnects are disclosed, described, and revisited from the discussion above. And as is readily apparent, the advances described above may be applied to any of those interconnects, fabrics, or architectures.

Figure 13:
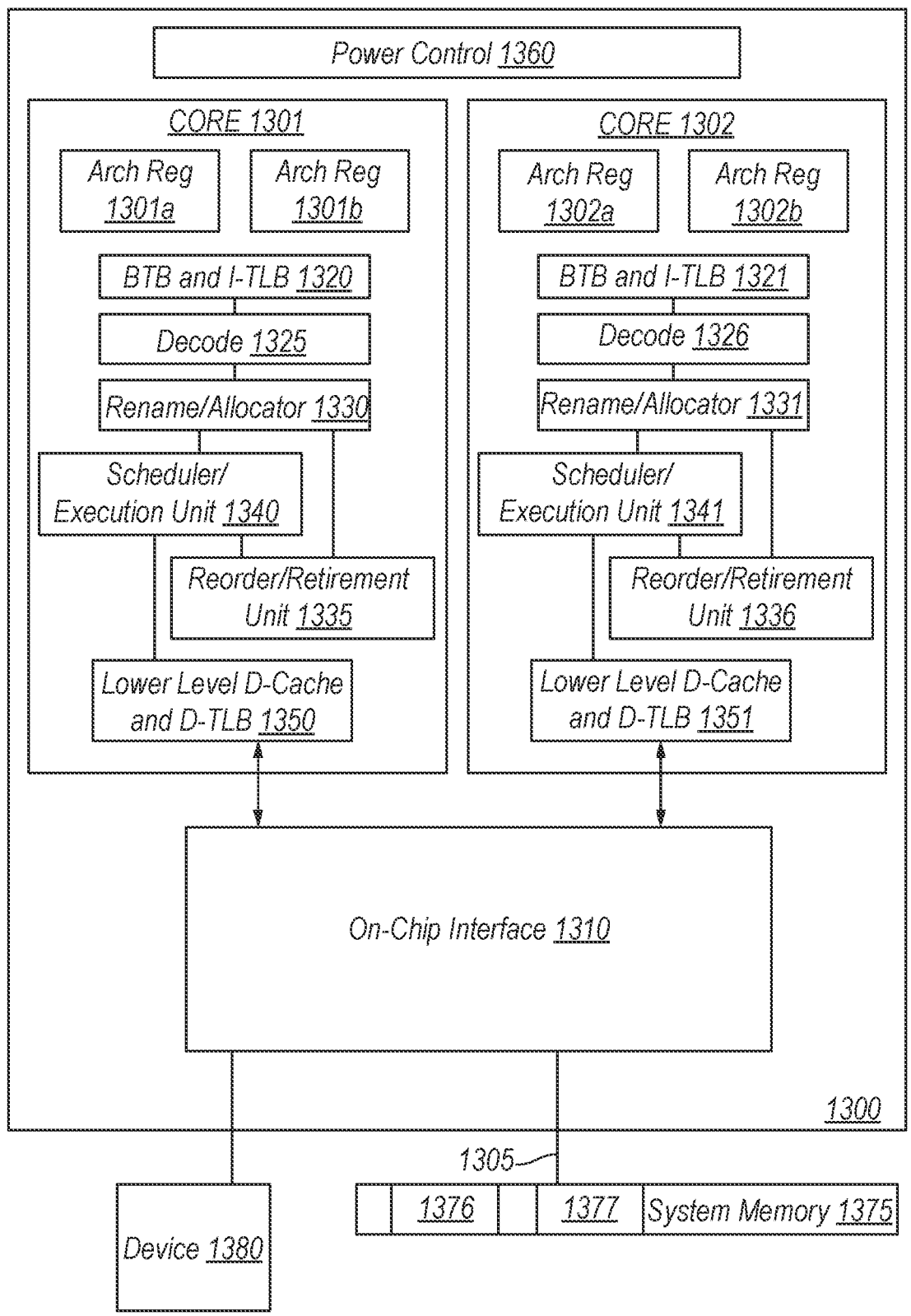
FIG. 13 illustrates an embodiment of a block diagram for a computing system including a multicore processor.

Referring to FIG. 13, an embodiment of a block diagram for a computing system including a multicore processor is depicted. Processor 1300 includes any processor or processing device, such as a microprocessor, an embedded processor, a digital signal processor (DSP), a network processor, a handheld processor, an application processor, a co-processor, a system on a chip (SOC), or other device to execute code. Processor 1300, in one embodiment, includes at least two cores—core 1301 and 1302, which may include asymmetric cores or symmetric cores (the illustrated embodiment). However, processor 1300 may include any number of processing elements that may be symmetric or asymmetric.

In one embodiment, a processing element refers to hardware or logic to support a software thread. Examples of hardware processing elements include: a thread unit, a thread slot, a thread, a process unit, a context, a context unit, a logical processor, a hardware thread, a core, and/or any other element, which is capable of holding a state for a processor, such as an execution state or architectural state. In other words, a processing element, in one embodiment, refers to any hardware capable of being independently associated with code, such as a software thread, operating system, application, or other code. A physical processor (or processor socket) typically refers to an integrated circuit, which potentially includes any number of other processing elements, such as cores or hardware threads.

A core often refers to logic located on an integrated circuit capable of maintaining an independent architectural state, wherein each independently maintained architectural state is associated with at least some dedicated execution resources. In contrast to cores, a hardware thread typically refers to any logic located on an integrated circuit capable of maintaining an independent architectural state, wherein the independently maintained architectural states share access to execution resources. As can be seen, when certain resources are shared and others are dedicated to an architectural state, the line between the nomenclature of a hardware thread and core overlaps. Yet often, a core and a hardware thread are viewed by an operating system as individual logical processors, where the operating system is able to individually schedule operations on each logical processor.

Physical processor 1300, as illustrated in FIG. 13, includes two cores—core 1301 and 1302. Here, core 1301 and 1302 are considered symmetric cores, i.e. cores with the same configurations, functional units, and/or logic. In another embodiment, core 1301 includes an out-of-order processor core, while core 1302 includes an in-order processor core. However, cores 1301 and 1302 may be individually selected from any type of core, such as a native core, a software managed core, a core adapted to execute a native Instruction Set Architecture (ISA), a core adapted to execute a translated Instruction Set Architecture (ISA), a co-designed core, or other known core. In a heterogeneous core environment (i.e. asymmetric cores), some form of translation, such a binary translation, may be utilized to schedule or execute code on one or both cores. Yet to further the discussion, the functional units illustrated in core 1301 are described in further detail below, as the units in core 1302 operate in a similar manner in the depicted embodiment.

As depicted, core 1301 includes two hardware threads 1301a and 1301b, which may also be referred to as hardware thread slots 1301a and 1301b. Therefore, software entities, such as an operating system, in one embodiment potentially view processor 1300 as four separate processors, i.e., four logical processors or processing elements capable of executing four software threads concurrently. As alluded to above, a first thread is associated with architecture state registers 1301a, a second thread is associated with architecture state registers 1301b, a third thread may be associated with architecture state registers 1302a, and a fourth thread may be associated with architecture state registers 1302b. Here, each of the architecture state registers (1301a, 1301b, 1302a, and 1302b) may be referred to as processing elements, thread slots, or thread units, as described above. As illustrated, architecture state registers 1301a are replicated in architecture state registers 1301b, so individual architecture states/contexts are capable of being stored for logical processor 1301a and logical processor 1301b. In core 1301, other smaller resources, such as instruction pointers and renaming logic in allocator and renamer block 1330 may also be replicated for threads 1301a and 1301b. Some resources, such as re-order buffers in reorder/retirement unit 1335, ILTB 1320, load/store buffers, and queues may be shared through partitioning. Other resources, such as general purpose internal registers, page-table base register(s), low-level data-cache and data-TLB 1315, execution unit(s) 1340, and portions of out-of-order unit 1335 are potentially fully shared.

Processor 1300 often includes other resources, which may be fully shared, shared through partitioning, or dedicated by/to processing elements. In FIG. 13, an embodiment of a purely exemplary processor with illustrative logical units/resources of a processor is illustrated. Note that a processor may include, or omit, any of these functional units, as well as include any other known functional units, logic, or firmware not depicted. As illustrated, core 1301 includes a simplified, representative out-of-order (OOO) processor core. But an in-order processor may be utilized in different embodiments. The OOO core includes a branch target buffer 1320 to predict branches to be executed/taken and an instruction-translation buffer (I-TLB) 1320 to store address translation entries for instructions.

Core 1301 further includes decode module 1325 coupled to fetch unit 1320 to decode fetched elements. Fetch logic, in one embodiment, includes individual sequencers associated with thread slots 1301a, 1301b, respectively. Usually core 1301 is associated with a first ISA, which defines/specifies instructions executable on processor 1300. Often machine code instructions that are part of the first ISA include a portion of the instruction (referred to as an opcode), which references/specifies an instruction or operation to be performed. Decode logic 1325 includes circuitry that recognizes these instructions from their opcodes and passes the decoded instructions on in the pipeline for processing as defined by the first ISA. For example, as discussed in more detail below decoders 1325, in one embodiment, include logic designed or adapted to recognize specific instructions, such as transactional instruction. As a result of the recognition by decoders 1325, the architecture or core 1301 takes specific, predefined actions to perform tasks associated with the appropriate instruction. It is important to note that any of the tasks, blocks, operations, and methods described herein may be performed in response to a single or multiple instructions; some of which may be new or old instructions. Note decoders 1326, in one embodiment, recognize the same ISA (or a subset thereof). Alternatively, in a heterogeneous core environment, decoders 1326 recognize a second ISA (either a subset of the first ISA or a distinct ISA).

In one example, allocator and renamer block 1330 includes an allocator to reserve resources, such as register files to store instruction processing results. However, threads 1301a and 1301b are potentially capable of out-of-order execution, where allocator and renamer block 1330 also reserves other resources, such as reorder buffers to track instruction results. Unit 1330 may also include a register renamer to rename program/instruction reference registers to other registers internal to processor 1300. Reorder/retirement unit 1335 includes components, such as the reorder buffers mentioned above, load buffers, and store buffers, to support out-of-order execution and later in-order retirement of instructions executed out-of-order.

Scheduler and execution unit(s) block 1340, in one embodiment, includes a scheduler unit to schedule instructions/operation on execution units. For example, a floating point instruction is scheduled on a port of an execution unit that has an available floating point execution unit. Register files associated with the execution units are also included to store information instruction processing results. Exemplary execution units include a floating point execution unit, an integer execution unit, a jump execution unit, a load execution unit, a store execution unit, and other known execution units.

Lower level data cache and data translation buffer (D-TLB) 1350 are coupled to execution unit(s) 1340. The data cache is to store recently used/operated on elements, such as data operands, which are potentially held in memory coherency states. The D-TLB is to store recent virtual/linear to physical address translations. As a specific example, a processor may include a page table structure to break physical memory into a plurality of virtual pages.

Here, cores 1301 and 1302 share access to higher-level or further-out cache, such as a second level cache associated with on-chip interface 1310. Note that higher-level or further-out refers to cache levels increasing or getting further way from the execution unit(s). In one embodiment, higher-level cache is a last-level data cache—last cache in the memory hierarchy on processor 1300—such as a second or third level data cache. However, higher level cache is not so limited, as it may be associated with or include an instruction cache. A trace cache—a type of instruction cache—instead may be coupled after decoder 1325 to store recently decoded traces. Here, an instruction potentially refers to a macro-instruction (i.e. a general instruction recognized by the decoders), which may decode into a number of micro-instructions (micro-operations).

In the depicted configuration, processor 1300 also includes on-chip interface module 1310. Historically, a memory controller, which is described in more detail below, has been included in a computing system external to processor 1300. In this scenario, on-chip interface 1310 is to communicate with devices external to processor 1300, such as system memory 1375, a chipset (often including a memory controller hub to connect to memory 1375 and an I/O controller hub to connect peripheral devices), a memory controller hub, a northbridge, or other integrated circuit. And in this scenario, bus 1305 may include any known interconnect, such as multi-drop bus, a point-to-point interconnect, a serial interconnect, a parallel bus, a coherent (e.g. cache coherent) bus, a layered protocol architecture, a differential bus, and a GTL bus.

Memory 1375 may be dedicated to processor 1300 or shared with other devices in a system. Common examples of types of memory 1375 include DRAM, SRAM, non-volatile memory (NV memory), and other known storage devices. Note that device 1380 may include a graphic accelerator, processor or card coupled to a memory controller hub, data storage coupled to an I/O controller hub, a wireless transceiver, a flash device, an audio controller, a network controller, or other known device.

Recently however, as more logic and devices are being integrated on a single die, such as SOC, each of these devices may be incorporated on processor 1300. For example in one embodiment, a memory controller hub is on the same package and/or die with processor 1300. Here, a portion of the core (an on-core portion) 1310 includes one or more controller(s) for interfacing with other devices such as memory 1375 or a graphics device 1380. The configuration including an interconnect and controllers for interfacing with such devices is often referred to as an on-core (or un-core configuration). As an example, on-chip interface 1310 includes a ring interconnect for on-chip communication and a high-speed serial point-to-point link 1305 for off-chip communication. Yet, in the SOC environment, even more devices, such as the network interface, co-processors, memory 1375, graphics processor 1380, and any other known computer devices/interface may be integrated on a single die or integrated circuit to provide small form factor with high functionality and low power consumption.

In one embodiment, processor 1300 is capable of executing a compiler, optimization, and/or translator code 1377 to compile, translate, and/or optimize application code 1376 to support the apparatus and methods described herein or to interface therewith. A compiler often includes a program or set of programs to translate source text/code into target text/code. Usually, compilation of program/application code with a compiler is done in multiple phases and passes to transform hi-level programming language code into low-level machine or assembly language code. Yet, single pass compilers may still be utilized for simple compilation. A compiler may utilize any known compilation techniques and perform any known compiler operations, such as lexical analysis, preprocessing, parsing, semantic analysis, code generation, code transformation, and code optimization.

Larger compilers often include multiple phases, but most often these phases are included within two general phases: (1) a front-end, i.e. generally where syntactic processing, semantic processing, and some transformation/optimization may take place, and (2) a back-end, i.e. generally where analysis, transformations, optimizations, and code generation takes place. Some compilers refer to a middle, which illustrates the blurring of delineation between a front-end and back end of a compiler. As a result, reference to insertion, association, generation, or other operation of a compiler may take place in any of the aforementioned phases or passes, as well as any other known phases or passes of a compiler. As an illustrative example, a compiler potentially inserts operations, calls, functions, etc. in one or more phases of compilation, such as insertion of calls/operations in a front-end phase of compilation and then transformation of the calls/operations into lower-level code during a transformation phase. Note that during dynamic compilation, compiler code or dynamic optimization code may insert such operations/calls, as well as optimize the code for execution during runtime. As a specific illustrative example, binary code (already compiled code) may be dynamically optimized during runtime. Here, the program code may include the dynamic optimization code, the binary code, or a combination thereof.

Similar to a compiler, a translator, such as a binary translator, translates code either statically or dynamically to optimize and/or translate code. Therefore, reference to execution of code, application code, program code, or other software environment may refer to: (1) execution of a compiler program(s), optimization code optimizer, or translator either dynamically or statically, to compile program code, to maintain software structures, to perform other operations, to optimize code, or to translate code; (2) execution of main program code including operations/calls, such as application code that has been optimized/compiled; (3) execution of other program code, such as libraries, associated with the main program code to maintain software structures, to perform other software related operations, or to optimize code; or (4) a combination thereof.

Referring now to FIG. 14, shown is a block diagram of another system 1400 in accordance with an embodiment of the present disclosure. As shown in FIG. 14, multiprocessor system 1400 is a point-to-point interconnect system, and includes a first processor 1470 and a second processor 1480 coupled via a point-to-point interconnect 1450. Each of processors 1470 and 1480 may be some version of a processor. In one embodiment, 1452 and 1454 are part of a serial, point-to-point coherent interconnect fabric, such as a high-performance architecture. As a result, aspects of the present disclosure may be implemented within the QPI architecture.

While shown with only two processors 1470, 1480, it is to be understood that the scope of the present disclosure is not so limited. In other embodiments, one or more additional processors may be present in a given processor.

Processors 1470 and 1480 are shown including integrated memory controller units 1472 and 1482, respectively. Processor 1470 also includes as part of its bus controller units point-to-point (P-P) interfaces 1476 and 1478; similarly, second processor 1480 includes P-P interfaces 1486 and 1488. Processors 1470, 1480 may exchange information via a point-to-point (P-P) interface 1450 using P-P interface circuits 1478, 1488. As shown in FIG. 14, IMCs 1472 and 1482 couple the processors to respective memories, namely a memory 1432 and a memory 1434, which may be portions of main memory locally attached to the respective processors.

Processors 1470, 1480 each exchange information with a chipset 1490 via individual P-P interfaces 1452, 1454 using point to point interface circuits 1476, 1494, 1486, 1498. Chipset 1490 also exchanges information with a high-performance graphics circuit 1438 via an interface circuit 1492 along a high-performance graphics interconnect 1439.

A shared cache (not shown) may be included in either processor or outside of both processors; yet connected with the processors via P-P interconnect, such that either or both processors' local cache information may be stored in the shared cache if a processor is placed into a low power mode.

Chipset 1490 may be coupled to a first bus 1416 via an interface 1496. In one embodiment, first bus 1416 may be a Peripheral Component Interconnect (PCI) bus, or a bus such as a PCI Express bus or another third generation I/O interconnect bus, although the scope of the present disclosure is not so limited.

As shown in FIG. 14, various I/O devices 1414 are coupled to first bus 1416, along with a bus bridge 1418 which couples first bus 1416 to a second bus 1420. In one embodiment, second bus 1420 includes a low pin count (LPC) bus. Various devices are coupled to second bus 1420 including, for example, a keyboard and/or mouse 1422, communication devices 1427 and a storage unit 1428 such as a disk drive or other mass storage device which often includes instructions/code and data 1430, in one embodiment. Further, an audio I/O 1424 is shown coupled to second bus 1420. Note that other architectures are possible, where the included components and interconnect architectures vary. For example, instead of the point-to-point architecture of FIG. 14, a system may implement a multi-drop bus or other such architecture.

While aspects of the present disclosure have been described with respect to a limited number of embodiments, those skilled in the art will appreciate numerous modifications and variations therefrom. It is intended that the appended claims cover all such modifications and variations as fall within the true spirit and scope of this present disclosure.

A design may go through various stages, from creation to simulation to fabrication. Data representing a design may represent the design in a number of manners. First, as is useful in simulations, the hardware may be represented using a hardware description language or another functional description language. Additionally, a circuit level model with logic and/or transistor gates may be produced at some stages of the design process. Furthermore, most designs, at some stage, reach a level of data representing the physical placement of various devices in the hardware model. In the case where conventional semiconductor fabrication techniques are used, the data representing the hardware model may be the data specifying the presence or absence of various features on different mask layers for masks used to produce the integrated circuit. In any representation of the design, the data may be stored in any form of a machine readable medium. A memory or a magnetic or optical storage such as a disc may be the machine readable medium to store information transmitted via optical or electrical wave modulated or otherwise generated to transmit such information. When an electrical carrier wave indicating or carrying the code or design is transmitted, to the extent that copying, buffering, or re-transmission of the electrical signal is performed, a new copy is made. Thus, a communication provider or a network provider may store on a tangible, machine-readable medium, at least temporarily, an article, such as information encoded into a carrier wave, embodying techniques of embodiments of the present disclosure.

A module as used herein refers to any combination of hardware, software, and/or firmware. As an example, a module includes hardware, such as a micro-controller, associated with a non-transitory medium to store code adapted to be executed by the micro-controller. Therefore, reference to a module, in one embodiment, refers to the hardware, which is specifically configured to recognize and/or execute the code to be held on a non-transitory medium. Furthermore, in another embodiment, use of a module refers to the non-transitory medium including the code, which is specifically adapted to be executed by the microcontroller to perform predetermined operations. And as can be inferred, in yet another embodiment, the term module (in this example) may refer to the combination of the microcontroller and the non-transitory medium. Often module boundaries that are illustrated as separate commonly vary and potentially overlap. For example, a first and a second module may share hardware, software, firmware, or a combination thereof, while potentially retaining some independent hardware, software, or firmware. In one embodiment, use of the term logic includes hardware, such as transistors, registers, or other hardware, such as programmable logic devices.

Use of the phrase 'configured to,' in one embodiment, refers to arranging, putting together, manufacturing, offering to sell, importing and/or designing an apparatus, hardware, logic, or element to perform a designated or determined task. In this example, an apparatus or element thereof that is not operating is still 'configured to' perform a designated task if it is designed, coupled, and/or interconnected to perform said designated task. As a purely illustrative example, a logic gate may provide a 0 or a 1 during operation. But a logic gate 'configured to' provide an enable signal to a clock does not include every potential logic gate that may provide a 1 or 0. Instead, the logic gate is one coupled in some manner that during operation the 1 or 0 output is to enable the clock. Note once again that use of the term 'configured to' does not require operation, but instead focus on the latent state of an apparatus, hardware, and/or element, where in the latent state the apparatus, hardware, and/or element is designed to perform a particular task when the apparatus, hardware, and/or element is operating.

Furthermore, use of the phrases 'to,' 'capable of/to,' and or 'operable to,' in one embodiment, refers to some apparatus, logic, hardware, and/or element designed in such a way to enable use of the apparatus, logic, hardware, and/or element in a specified manner. Note as above that use of to, capable to, or operable to, in one embodiment, refers to the latent state of an apparatus, logic, hardware, and/or element, where the apparatus, logic, hardware, and/or element is not operating but is designed in such a manner to enable use of an apparatus in a specified manner.

A value, as used herein, includes any known representation of a number, a state, a logical state, or a binary logical state. Often, the use of logic levels, logic values, or logical values is also referred to as 1's and 0's, which simply represents binary logic states. For example, a 1 refers to a high logic level and 0 refers to a low logic level. In one embodiment, a storage cell, such as a transistor or flash cell, may be capable of holding a single logical value or multiple logical values. However, other representations of values in computer systems have been used. For example the decimal number ten may also be represented as a binary value of 1010 and a hexadecimal letter A. Therefore, a value includes any representation of information capable of being held in a computer system.

Moreover, states may be represented by values or portions of values. As an example, a first value, such as a logical one, may represent a default or initial state, while a second value, such as a logical zero, may represent a non-default state. In addition, the terms reset and set, in one embodiment, refer to a default and an updated value or state, respectively. For example, a default value potentially includes a high logical value, i.e. reset, while an updated value potentially includes a low logical value, i.e. set. Note that any combination of values may be utilized to represent any number of states.

The embodiments of methods, hardware, software, firmware or code set forth above may be implemented via instructions or code stored on a machine-accessible, machine readable, computer accessible, or computer readable medium which are executable by a processing element. A non-transitory machine-accessible/readable medium includes any mechanism that provides (i.e., stores and/or transmits) information in a form readable by a machine, such as a computer or electronic system. For example, a non-transitory machine-accessible medium includes random-access memory (RAM), such as static RAM (SRAM) or dynamic RAM (DRAM); ROM; magnetic or optical storage medium; flash memory devices; electrical storage devices; optical storage devices; acoustical storage devices; other form of storage devices for holding information received from transitory (propagated) signals (e.g., carrier waves, infrared signals, digital signals); etc., which are to be distinguished from the non-transitory mediums that may receive information there from.

Instructions used to program logic to perform embodiments of the present disclosure may be stored within a memory in the system, such as DRAM, cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer).

The following examples pertain to embodiments in accordance with this Specification. Although each example described below is described with respect to Compute Express Link (CXL)-based protocols, any of the following examples may be utilized for a PCIe-based protocol, a Universal Serial Bus (USB)-based protocol, a Cache Coherent Interconnect for Accelerators (CCIX) protocol, or a Transmission Control Protocol/Internet Protocol (TCP/IP).

Example A1 is an apparatus that includes: a port to transmit and receive data over a link; and protocol stack circuitry to implement one or more layers of a load-store input/output (I/O)-based protocol across the link, wherein protocol stack circuitry is to: receive a request to initiate a memory write transaction on the link; construct a memory write request transaction layer packet (TLP) for the memory write transaction, wherein fields of the memory write request TLP indicate a non-default traffic class for the TLP (e.g., a virtual channel (VC) other than VC0), that a completion is required in response to the memory write transaction, and a stream identifier associated with the memory write transaction; cause the memory write request TLP to be transmitted over the link; and process a completion TLP received over the link, the completion TLP indicating a completion for the memory write request TLP.

Example A2 includes the subject matter of Example A1, wherein the memory write request TLP is a Memory Write TLP, and the indication that a completion is required in response to the memory write transaction is included in two upper bits of a tag field of the Memory Write TLP, two reserved bits of the Memory Write TLP, or a combination of 1 tag field bit and 1 reserved bit of the Memory Write TLP.

Example A3 includes the subject matter of Example A1, wherein the memory write request TLP is a Streamed Write TLP, and the indication that a completion is required in response to the memory write transaction is included in one or more fields of the Streamed Write TLP.

Example A4 includes the subject matter of Example A3, wherein the Streamed Write TLP is indicated (e.g., in one or more of a format and type field of the TLP) with a value other than 0100_0000b, or another value already associated with a TLP type.

Example A5 includes the subject matter of Example A4, wherein the Streamed Write TLP is indicated (e.g., in one or more of a format and type field of the TLP) with a value of 0101_1100b or 0101_1101b.

Example A6 includes the subject matter of Example A3, wherein the protocol stack circuitry is to construct a plurality of Streamed Write TLPs associated with the same stream identifier, the completion TLP is a Streamed Write Completion TLP that indicates a completion for each the plurality of Streamed Write TLPs.

Example A7 includes the subject matter of Example A6, wherein the Streamed Write Completion TLP is indicated (e.g., in one or more of a format and type field of the TLP) with a value other than 0000_1010b or 0100_1010b, or another value already associated with a TLP type.

Example A8 includes the subject matter of Example A7, wherein the Streamed Write Completion TLP is indicated (e.g., in one or more of a format and type field of the TLP) with a value of 0000_1100b.

Example A9 includes the subject matter of Example A6, wherein a tag field of the completion TLP indicates the stream identifier associated with the plurality of Streamed Write TLPs.

Example A10 includes the subject matter of Example A6, wherein a byte count field of the completion TLP indicates a number of completions indicated by the completion TLP.

Example A11 includes the subject matter of any of Examples A1-A10, wherein the stream identifier is indicated in a tag field of the memory write request TLP.

Example A12 includes the subject matter of any of Examples A1-A11, wherein the memory write request TLP further includes a field indicating that completion coalescence is allowed.

Example A13 includes the subject matter of any of Examples A1-A12, wherein the memory write request TLP is tracked using a non-posted transaction type buffer.

Example A14 includes the subject matter of any of Examples A1-A13, wherein the protocol stack circuitry implements a PCIe-based or a CXL-based protocol across the link and the non-default traffic class indicates a virtual channel (VC) other than VC0.

Example M1 includes a method comprising receiving a request to initiate a memory write transaction on a link implementing a load-store input/output (I/O)-based protocol; constructing a memory write request transaction layer packet (TLP) for the memory write transaction, wherein fields of the memory write request TLP indicate a non-default traffic class for the TLP (e.g., virtual channel (VC) other than VC0), that a completion is required in response to the memory write transaction, and a stream identifier associated with the memory write transaction; transmitting the memory write request TLP over the link; and receiving a completion TLP over the link, the completion TLP indicating a completion for the memory write request TLP.

Example M2 includes the subject matter of Example M1, wherein the memory write request TLP is a Memory Write TLP, and the indication that a completion is required in response to the memory write transaction is included in two upper bits of a tag field of the Memory Write TLP, two reserved bits of the Memory Write TLP, or a combination of 1 tag field bit and 1 reserved bit of the Memory Write TLP.

Example M3 includes the subject matter of Example M1, wherein the memory write request TLP is a Streamed Write TLP, and the indication that a completion is required in response to the memory write transaction is included in one or more fields of the Streamed Write TLP.

Example M4 includes the subject matter of Example M3, wherein the Streamed Write TLP is indicated (e.g., in one or more of a format and type field of the TLP) with a value other than 0100_0000b, or another value already associated with a TLP type.

Example M5 includes the subject matter of Example M4, wherein the Streamed Write TLP is indicated (e.g., in one or more of a format and type field of the TLP) with a value of 0101_1100b or 0101_1101b.

Example M6 includes the subject matter of Example M3, further comprising constructing a plurality of Streamed Write TLPs associated with the same stream identifier, the completion TLP is a Streamed Write Completion TLP that indicates a completion for each the plurality of Streamed Write TLPs.

Example M7 includes the subject matter of Example M6, wherein the Streamed Write Completion TLP is indicated (e.g., in one or more of a format and type field of the TLP) with a value other than 0000_1010b or 0100_1010b, or another value already associated with a TLP type.

Example M8 includes the subject matter of Example M7, wherein the Streamed Write Completion TLP is indicated (e.g., in one or more of a format and type field of the TLP) with a value of 0000_1100b.

Example M9 includes the subject matter of Example M6, wherein a tag field of the completion TLP indicates the stream identifier associated with the plurality of Streamed Write TLPs.

Example M10 includes the subject matter of Example M6, wherein a byte count field of the completion TLP indicates a number of completions indicated by the completion TLP.

Example M11 includes the subject matter of any of Examples M1-M10, wherein the stream identifier is indicated in a tag field of the memory write request TLP.

Example M12 includes the subject matter of any of Examples M1-M11, wherein the memory write request TLP further includes a field indicating that completion coalescence is allowed.

Example M13 includes the subject matter of any of Examples M1-M12, wherein the memory write request TLP is tracked using a non-posted transaction type buffer.

Example M14 includes the subject matter of any of Examples M1-M13, wherein the load-store input/output (I/O)-based protocol is a PCIe-based or a CXL-based protocol and the non-default traffic class indicates a virtual channel (VC) other than VC0.

Example S1 includes a system comprising a processor; a first device; and a second device; wherein the processor, first device, and second device are coupled to one another via a load-store input/output (I/O) protocol-based interconnect, and each includes protocol circuitry to: construct memory write request transaction layer packets (TLPs) for memory write transactions to be performed on the interconnect, wherein fields of the memory write request TLPs indicate a non-default traffic class for the TLP (e.g., a virtual channel (VC) other than VC0), that a completion is required in response to the memory write transaction, and a stream identifier associated with the memory write transaction; and process completion TLPs received over the interconnect indicating completions for the memory write request TLPs.

Example S2 includes the subject matter of Example S1, wherein the memory write request TLP is a Memory Write TLP, and the indication that a completion is required in response to the memory write transaction is included in two upper bits of a tag field of the Memory Write TLP, two reserved bits of the Memory Write TLP, or a combination of 1 tag field bit and 1 reserved bit of the Memory Write TLP.

Example S3 includes the subject matter of Example S1, wherein the memory write request TLP is a Streamed Write TLP, and the indication that a completion is required in response to the memory write transaction is included in one or more fields of the Streamed Write TLP.

Example S4 includes the subject matter of Example S3, wherein the Streamed Write TLP is indicated (e.g., in one or more of a format and type field of the TLP) with a value other than 0100_0000b, or another value already associated with a TLP type.

Example S5 includes the subject matter of Example S4, wherein the Streamed Write TLP is indicated (e.g., in one or more of a format and type field of the TLP) with a value of 0101_1100b or 0101_1101b.

Example S6 includes the subject matter of Example S3, wherein the protocol circuitry is to construct a plurality of Streamed Write TLPs associated with the same stream identifier, the completion TLP is a Streamed Write Completion TLP that indicates a completion for each the plurality of Streamed Write TLPs.

Example S7 includes the subject matter of Example S6, wherein the Streamed Write Completion TLP is indicated (e.g., in one or more of a format and type field of the TLP) with a value other than 0000_1010b or 0100_1010b, or another value already associated with a TLP type.

Example S8 includes the subject matter of Example S7, wherein the Streamed Write Completion TLP is indicated (e.g., in one or more of a format and type field of the TLP) with a value of 0000_1100b.

Example S9 includes the subject matter of Example S6, wherein a tag field of the completion TLP indicates the stream identifier associated with the plurality of Streamed Write TLPs.

Example S10 includes the subject matter of Example S6, wherein a byte count field of the completion TLP indicates a number of completions indicated by the completion TLP.

Example S11 includes the subject matter of any of Examples S1-S10, wherein the stream identifier is indicated in a tag field of the memory write request TLP.

Example S12 includes the subject matter of any of Examples S1-S11, wherein the memory write request TLP further includes a field indicating that completion coalescence is allowed.

Example S13 includes the subject matter of any of Examples S1-S12, wherein the memory write request TLP is tracked using a non-posted transaction type buffer.

Example S14 includes the subject matter of any of Examples S1-S13, wherein the protocol circuitry implements a PCIe-based or a CXL-based protocol across the link and the non-default traffic class indicates a virtual channel (VC) other than VC0.

Example S15 includes the subject matter of any of Examples S1-S14, wherein the processor is a root port of the PCIe-based interconnect, and the system further comprises a switch positioned in the interconnect between the processor, the first device, and the second device, wherein the switch is to transmit memory write request TLPs from the first device to the second device without involving the processor.

Example S16 includes the subject matter of any one of Examples S1-S14, further comprising a CXL-based switch positioned in the interconnect between the processor, the first device, and the second device, wherein the switch is to transmit memory write request TLPs from the first device to the second device using a CXL.io protocol.

Example MF1 includes an apparatus comprising: means for constructing a memory write request transaction layer packet (TLP) for the memory write transaction, wherein fields of the memory write request TLP indicate a virtual channel (VC) other than VC0, that a completion is required in response to the memory write transaction, and a stream identifier associated with the memory write transaction; means for transmitting the memory write request TLP over a link based on a load-store I/O protocol; and means for receiving a completion TLP over the link, the completion TLP indicating a completion for the memory write request TLP.

Example MF2 includes the subject matter of Example MF1, wherein the means for constructing TLPs includes protocol stack circuitry to implement a PCIe-based or CXL-based protocol across the link.

Example X1 includes an apparatus comprising means to perform one or more elements of a method described in or related to any of Examples M1-M14 above, or any other method or process described herein.

Example X2 includes an apparatus comprising logic, modules, or circuitry to perform one or more elements of a method described in or related to any of Examples M1-M14 above, or any other method or process described herein.

Example X3 includes a system comprising: one or more processors and one or more computer-readable media comprising instructions that, when executed by the one or more processors, cause the one or more processors to perform the method, techniques, or process as described in or related to any of Examples M1-M14 above, or portions thereof Reference throughout this specification to "one embodiment" or "an embodiment" means that a particular feature, structure, or characteristic described in connection with the embodiment is included in at least one embodiment of the present disclosure. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In the foregoing, a detailed description has been given with reference to specific exemplary embodiments. It will, however, be evident that various modifications and changes may be made thereto without departing from the broader spirit and scope as set forth in the appended claims. The specification and drawings are, accordingly, to be regarded in an illustrative sense rather than a restrictive sense. Furthermore, the foregoing use of embodiment and other exemplarily language does not necessarily refer to the same embodiment or the same example, but may refer to different and distinct embodiments, as well as potentially the same embodiment.

What is claimed is:

1. An apparatus comprising:
   a port to transmit and receive data over a link; and
   protocol stack circuitry to implement one or more layers of a Peripheral Component Interconnect Express (PCIe)-based or a Compute Express Link (CXL)-based protocol across the link, wherein protocol stack circuitry is to:
   receive a request to initiate a memory write transaction on the link;
   construct a memory write request transaction layer packet (TLP) for the memory write transaction, wherein fields of the memory write request TLP indicate a virtual channel (VC) other than VC0 for the TLP, that a completion is required in response to the memory write transaction, and a stream identifier associated with the memory write transaction;
   cause the memory write request TLP to be transmitted over the link; and process a completion TLP received over the link, the completion TLP indicating a completion for the memory write request TLP.

2. The apparatus of claim 1, wherein the memory write request TLP is a Memory Write TLP, and the indication that a completion is required in response to the memory write transaction is included in two upper bits of a tag field of the Memory Write TLP, two reserved bits of the Memory Write TLP, or a combination of 1 tag field bit and 1 reserved bit of the Memory Write TLP.

3. The apparatus of claim 1, wherein the memory write request TLP is a Streamed Write TLP, and the indication that a completion is required in response to the memory write transaction is included in one or more fields of the Streamed Write TLP.

4. The apparatus of claim 3, wherein the Streamed Write TLP is indicated with a value other than 0100_0000b.

5. The apparatus of claim 4, wherein the Streamed Write TLP is indicated with a value of 0101_1100b or 0101_1101b.

6. The apparatus of claim 3, wherein the protocol stack circuitry is to construct a plurality of Streamed Write TLPs associated with a same stream identifier, the completion TLP is a Streamed Write Completion TLP that indicates a completion for each the plurality of Streamed Write TLPs.

7. The apparatus of claim 6, wherein the Streamed Write Completion TLP is indicated with a value other than 0000_1010b or 0100_1010b.

8. The apparatus of claim 7, wherein the Streamed Write Completion TLP is indicated with a value of 0000_1100b.

9. The apparatus of claim 6, wherein a tag field of the completion TLP indicates the stream identifier associated with the plurality of Streamed Write TLPs.

10. The apparatus of claim 6, wherein a byte count field of the completion TLP indicates a number of completions indicated by the completion TLP.

11. The apparatus of claim 1, wherein the stream identifier is indicated in a tag field of the memory write request TLP.

12. The apparatus of claim 1, wherein the memory write request TLP further includes a field indicating that completion coalescence is allowed.

13. The apparatus of claim 1, wherein the memory write request TLP is tracked using a non-posted transaction type buffer.

14. A method comprising:
receiving a request to initiate a memory write transaction on a link implementing a Peripheral Component Interconnect Express (PCIe)-based or a Compute Express Link (CXL)-based protocol;
constructing a memory write request transaction layer packet (TLP) for the memory write transaction, wherein fields of the memory write request TLP indicate a virtual channel (VC) other than VC0 for the TLP, that a completion is required in response to the memory write transaction, and a stream identifier associated with the memory write transaction;
transmitting the memory write request TLP over the link; and
receiving a completion TLP over the link, the completion TLP indicating a completion for the memory write request TLP.

15. The method of claim 14, wherein the memory write request TLP is a Memory Write TLP, and the indication that a completion is required in response to the memory write transaction is included in two upper bits of a tag field of the Memory Write TLP, two reserved bits of the Memory Write TLP, or a combination of 1 tag field bit and 1 reserved bit of the Memory Write TLP.

16. The method of claim 14, wherein the memory write request TLP is a Streamed Write TLP, and the indication that a completion is required in response to the memory write transaction is included in one or more fields of the Streamed Write TLP.

17. The method of claim 16, further comprising constructing a plurality of Streamed Write TLPs associated with a same stream identifier, the completion TLP is a Streamed Write Completion TLP that indicates a completion for each the plurality of Streamed Write TLPs.

18. The method of claim 17, wherein a tag field of the completion TLP indicates the stream identifier associated with the plurality of Streamed Write TLPs.

19. The method of claim 17, wherein a byte count field of the completion TLP indicates a number of completions indicated by the completion TLP.

20. The method of claim 14, wherein the stream identifier is indicated in a tag field of the memory write request TLP.

21. A system comprising:
a processor;
a first device; and
a second device;
wherein the processor, first device, and second device are coupled to one another via a Peripheral Component Interconnect Express (PCIe)-based or Compute Express Link (CXL)-based interconnect, and each includes protocol circuitry to:
construct memory write request transaction layer packets (TLPs) for memory write transactions to be performed on the interconnect, wherein fields of the memory write request TLPs indicate a virtual channel (VC) other than VC0 for the TLPs, that a completion is required in response to the memory write transaction, and a stream identifier associated with the memory write transaction; and
process completion TLPs received over the interconnect indicating completions for the memory write request TLPs.

22. The system of claim 21, wherein the processor is a root port of the PCIe-based or CXL-based interconnect, and the system further comprises a switch positioned in the interconnect between the processor, the first device, and the second device, wherein the switch is to transmit memory write request TLPs from the first device to the second device without involving the processor.

23. The system of claim 21, further comprising a CXL-based switch positioned in the interconnect between the processor, the first device, and the second device, wherein the switch is to transmit memory write request TLPs from the first device to the second device using a CXL.io protocol.

* * * * *